US012590615B2

(12) United States Patent
Deng et al.

(10) Patent No.: US 12,590,615 B2
(45) Date of Patent: Mar. 31, 2026

(54) BRAKE DISC SYSTEM

(71) Applicant: Honeywell International Inc.,
Charlotte, NC (US)

(72) Inventors: Fangmin Deng, Changsha (CN);
Zhanjun Zheng, Shanghai (CN);
Chenghao Dai, Changsha (CN)

(73) Assignee: Honeywell International Inc.,
Charlotte, NC (US)

( * ) Notice: Subject to any disclaimer, the term of this
patent is extended or adjusted under 35
U.S.C. 154(b) by 415 days.

(21) Appl. No.: 18/179,951

(22) Filed: Mar. 7, 2023

(65) Prior Publication Data

US 2024/0301927 A1       Sep. 12, 2024

(51) Int. Cl.
| *F16D 65/12* | (2006.01) |
| *F16D 13/68* | (2006.01) |
| *F16D 65/02* | (2006.01) |

(52) U.S. Cl.
CPC ......... *F16D 65/127* (2013.01); *F16D 65/121*
(2013.01); *F16D 65/122* (2013.01); *F16D*
*65/126* (2013.01); *F16D 2065/1312* (2013.01);
*F16D 2065/132* (2013.01); *F16D 2065/1392*
(2013.01); *F16D 2250/0084* (2013.01)

(58) Field of Classification Search
CPC .... F16D 65/121; F16D 65/122; F16D 65/126;
F16D 65/127; F16D 13/68; F16D
2065/1312; F16D 2065/132; F16D
2065/1392; F16D 2250/0084; F16D
2069/0433; F16D 2069/0441
See application file for complete search history.

(56) References Cited

U.S. PATENT DOCUMENTS

| 4,941,558 | A | * | 7/1990 | Schraut | .................. | F16D 13/64 |
| | | | | | | 192/107 C |
| 5,558,186 | A | | 9/1996 | Hyde et al. | | |
| 6,536,564 | B1 | | 3/2003 | Garfinkel et al. | | |
| 9,194,447 | B2 | * | 11/2015 | Kirkpatrick | .......... | F16D 65/126 |
| 9,416,831 | B2 | | 8/2016 | Nixon et al. | | |
| 10,240,648 | B2 | | 3/2019 | Cole, Jr. et al. | | |
| 10,274,034 | B2 | * | 4/2019 | Fiala | ..................... | F16D 65/126 |
| 10,941,823 | B2 | * | 3/2021 | Reed | ....................... | F16D 55/36 |
| 11,209,059 | B2 | * | 12/2021 | O'Neil | .................. | F16D 69/02 |
| 2001/0007296 | A1 | | 7/2001 | Roloff et al. | | |
| 2012/0255820 | A1 | | 10/2012 | McCord et al. | | |

(Continued)

FOREIGN PATENT DOCUMENTS

| CN | 106080975 | A | 11/2016 |
| CN | 109741655 | A | 5/2019 |

(Continued)

*Primary Examiner* — Thomas W Irvin
(74) *Attorney, Agent, or Firm* — Shumaker & Sieffert,
P.A.

(57) ABSTRACT

In some examples, a brake disc includes a lining carrier and
a friction pad covering a carrier surface of the lining carrier.
The lining carrier defines a recess configured to receive a
protrusion extending from the carrier surface when the
friction pad covers the carrier surface. The friction pad is
configured to transfer a torque to the lining carrier via the
protrusion when a friction surface of brake disc engages an
adjacent brake disc during a braking operation of a brake
assembly. In examples, the brake disc includes a fastener
configured to couple the lining carrier and the friction pad.

18 Claims, 8 Drawing Sheets

(56) References Cited

U.S. PATENT DOCUMENTS

| 2013/0112514 A1* | 5/2013 | Hanna ................ F16D 65/0006 |
| | | 188/218 XL |
| 2014/0196992 A1 | 7/2014 | Iraschko |
| 2015/0129369 A1* | 5/2015 | Kirkpatrick ........... F16D 65/126 |
| | | 188/218 XL |
| 2018/0347648 A1 | 12/2018 | Knoop |
| 2019/0017562 A1* | 1/2019 | Fiala ....................... F16D 55/36 |
| 2019/0162260 A1* | 5/2019 | Reed ...................... F16D 55/24 |
| 2020/0240486 A1* | 7/2020 | O'Neil ................. F16D 65/186 |
| 2020/0292019 A1* | 9/2020 | O'Neil ................. F16D 65/186 |
| 2021/0003183 A1* | 1/2021 | Bourlier ................. F16D 55/36 |
| 2021/0396286 A1 | 12/2021 | Davis et al. |
| 2022/0003287 A1* | 1/2022 | Bourlier ............... F16D 65/126 |
| 2022/0099150 A1* | 3/2022 | Boffelli ................. F16D 65/847 |
| 2023/0012996 A1* | 1/2023 | Boffelli ................. F16D 65/121 |
| 2025/0154997 A1* | 5/2025 | Kirkpatrick ........... F16D 65/092 |

FOREIGN PATENT DOCUMENTS

| CN | 113772014 A | 12/2021 |
| CN | 216943454 U | 7/2022 |

* cited by examiner

1002

COVERING A CARRIER SURFACE OF A LINING CARRIER WITH A FRICTION PAD

1004

TRANSFERRING A TORQUE FROM THE FRICTION PAD TO A PROTRUSION EXTENDING FROM THE CARRIER SURFACE

BRAKE DISC SYSTEM

TECHNICAL FIELD

The present disclosure relates to a brake disc for use in brake systems.

BACKGROUND

Brake systems may include a multi-disc brake assembly. The multi-disc brake assembly may include a disc stack comprising a plurality of rotor discs engaged with a rotational component and a plurality of stator discs interleaved with the rotor discs. The rotor discs and rotational component are configured to rotate around an axis, while the stator discs remain stationary. To decelerate rotational motion of the rotational component, the brake assembly may displace pistons against a pressure plate to compress the rotating rotor discs engaged with the rotational component against the stationary stator discs, therefore producing torque that decelerates the rotational motion of the rotational component. In some examples, the rotor discs may be engaged with the rotational component via rotor drive keys positioned on the rotational component. In some examples, stator discs may be engaged with a stationary torque tube surrounding the axis via splines positioned on the torque tube. In some such examples, the brake assembly may be configured to compress the rotor discs and the stator discs between the piston and a backing plate supported by the torque tube.

SUMMARY

The present disclosure describes articles, systems, and techniques relating to a brake disc of a brake assembly. The brake disc is configured to rotate around a disc axis extending through a disc aperture defined by the brake disc. In examples described herein, the brake disc includes a friction pad covering a surface of a lining carrier such that the friction pad rotates around the disc axis when the lining carrier rotates around the disc access. In examples, a fastener couples the lining carrier and the friction pad. The friction pad is configured to experience a torque around the disc axis when the brake disc rotates relative to an adjacent brake disc and the friction pad engages a friction surface of the adjacent brake disc.

The brake disc includes a protrusion extending from the lining carrier. The protrusion is configured to insert into a recess of the friction pad when the friction pad covers the carrier surface. A recess boundary of the recess is configured to transfer the torque received by the friction pad to the protrusion, such that the friction pad transfers the torque to the lining carrier via the protrusion. In examples, the friction pad defines a plurality of recesses and lining carrier defines a plurality of protrusions. The friction pad may be configured to transfer the torque to the plurality of protrusions using the plurality of recesses. In examples, friction pad is configured to cover a surface on a first side of the lining carrier, and the brake disc includes a second friction pad configured to cover a surface on a second side of the lining carrier.

In an example, a brake disc comprises: a lining carrier configured to rotate around a disc axis, wherein the lining carrier defines a carrier surface and a protrusion extending from the carrier surface, and wherein the carrier surface and the protrusion are configured to rotate around the disc axis when the lining carrier rotates about the disc axis; a friction pad configured to cover the carrier surface, wherein the friction pad defines a recess boundary defining a recess, wherein the friction pad is configured to rotate around the disc axis when the lining carrier rotates about the disc axis and the friction pad covers the carrier surface, wherein the protrusion is configured to insert within the recess when the friction pad covers the carrier surface, and wherein the recess boundary is configured to transfer a torque around the disc axis from the friction pad to the protrusion when the protrusion is inserted in the recess and the torque is imparted to the friction pad.

In an example, a brake disc comprises: a lining carrier defining an inner perimeter defining a disc aperture and an outer perimeter surrounding the inner perimeter, wherein the lining carrier is configured to rotate around a disc axis extending through the aperture, wherein the lining carrier defines a carrier surface between the inner perimeter and the outer perimeter and a protrusion extending from the carrier surface, wherein the carrier surface and the protrusion are configured to rotate around the disc axis when the lining carrier rotates about the disc axis, and wherein the lining carrier defines a disc slot on one of the inner perimeter or the outer perimeter, the disc slot configured to receive a torque around the disc axis from a rotor drive key or a spline extending through the disc slot; a friction pad configured to cover at least a carrier surface, wherein the friction pad defines a recess boundary defining a recess; and a fastener configured to extend through at least a portion of the friction pad to couple the friction pad to the lining carrier, wherein the friction pad is configured to rotate around the disc axis when the lining carrier rotates about the disc axis and the friction pad is coupled to the lining carrier, wherein the protrusion is configured to insert within the recess when the friction pad is coupled to the lining carrier, and wherein recess boundary is configured to transfer a torque around the disc axis from the friction pad to the protrusion when the protrusion is inserted in the recess and the and the torque is imparted to the friction pad In an example, a technique comprises: covering, using a friction pad defining a recess boundary defining a recess, at least a portion of a carrier surface of a lining carrier of a brake disc, wherein a protrusion extends from the carrier surface, wherein the friction pad is configured to rotate around a disc axis when the friction pad covers the carrier surface and the lining carrier rotates about the disc axis, and wherein the protrusion inserts within the recess when the friction pad cover the carrier surface; transferring a torque on the friction pad, using the recess boundary, to the protrusion; and transferring the torque, using the protrusion, to a body of the lining carrier.

The details of one or more examples are set forth in the accompanying drawings and the description below. Other features, objects, and advantages will be apparent from the description and drawings, and from the claims.

DETAILED DESCRIPTION

Figure 1:
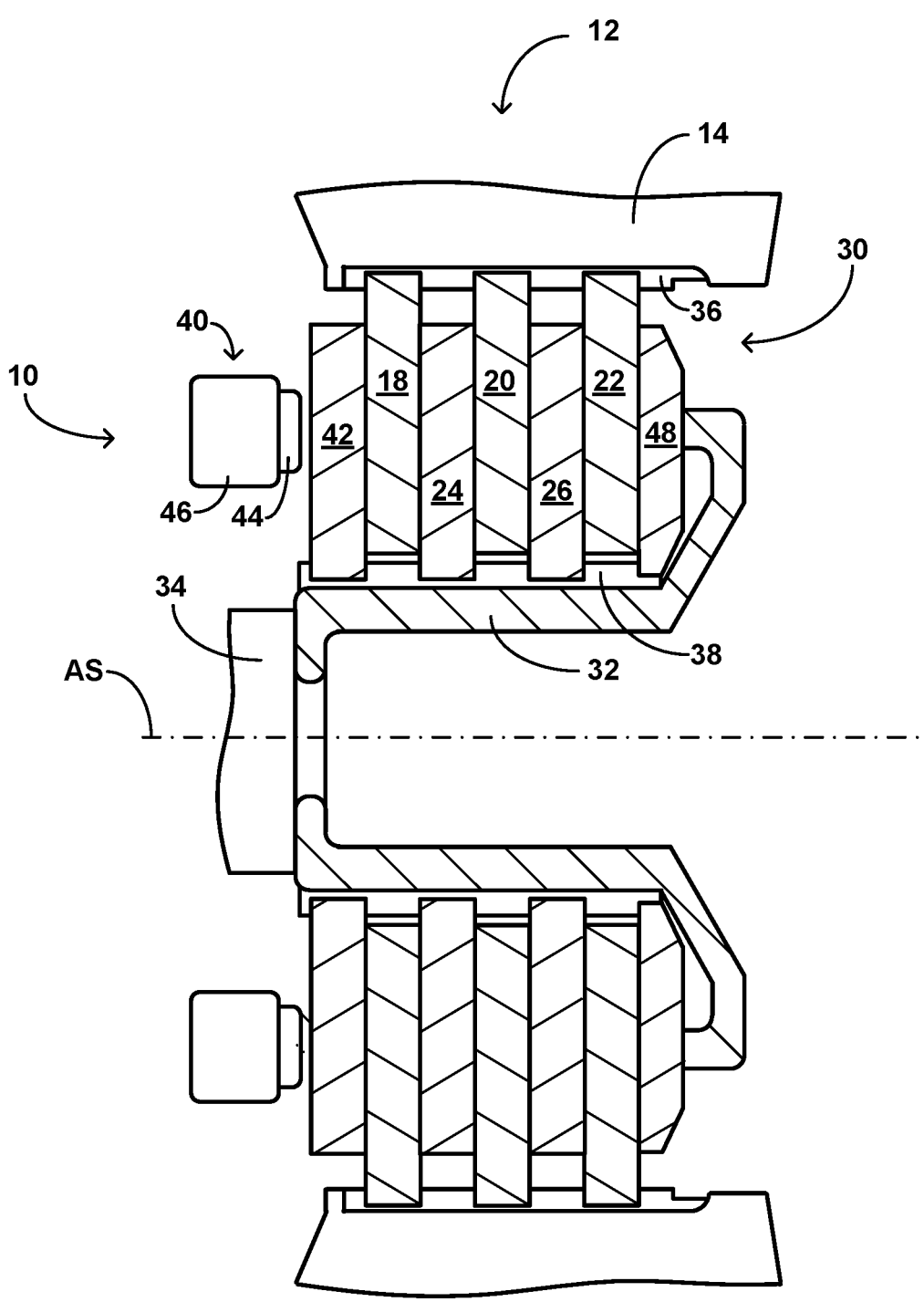
FIG. 1 is a schematic cross-sectional view illustrating an example brake assembly including a plurality of brake discs.

The disclosure describes articles, systems, and techniques relating to a brake system comprising a brake disc. The brake disc system includes a rotational component configured to rotate around a system axis. For example, the rotational component may be a wheel of a vehicle, a windlass pulley, or another rotational component of a system. The brake system may include a disc stack which includes one or more rotor discs and one or more stator discs. For example, the disc stack may include a plurality of rotor discs interleaved with a plurality of stator discs. The rotor discs are rotationally coupled with the rotational component, such that a rotation of the rotational component around the system axis causes rotation of the rotor discs around the system axis. The stator discs are configured to remain substantially stationary relative to the rotational component and the rotor discs. The brake assembly is configured to compress the disc stack to cause engagement of friction surfaces on the rotating rotor discs and the stationary stator discs, reducing a rotational speed of the rotor discs around the system axis. The rotor discs are configured to engage the rotational component, such that the reduction in the rotational speed of the rotor discs causes a reduction in the speed of the rotational component.

The brake disc disclosed herein may be one of a rotor disc or a stator disc. The brake disc includes at least one friction pad defining a friction surface. When the disc stack is compressed, the brake disc is configured to engage a friction pad of an adjacent disc in the disc stack, generating shearing forces on the friction pad and a torque on the brake disc. For example, when the brake disc is a rotor disc rotating around the system axis, compression of the disc stack may bring the friction pad into contact with a friction pad of a stator disc which is rotationally stationary with respect to the rotating rotor disc. Contact between the respective friction pads causes shearing forces between the friction pads and generates a torque on the rotor disc tending to slow the rotation of the rotor disc. When the brake disc is a stator disc configured to be rotationally stationary relative to the rotor disc, the shearing forces generate a torque on the stator disc which is transferred to a component of a brake system, such spline of a torque tube. In either case, the torque on the brake disc transfers through the friction pad of the brake disc, such that the friction pad experiences a torque around the system axis.

In examples described herein, a brake disc includes a lining carrier defining a carrier surface and a friction pad configured to cover at least a portion of the carrier surface. The lining carrier and the friction pad are configured rotate around a disc axis. The disc axis may be substantially parallel to a system axis of a brake system when the brake disc is used in the brake system. The lining carrier is configured such that the friction pad engages a friction pad of an adjacent brake disc ("adjacent disc friction pad") when the brake disc is a rotor disc or a stator disc in a disc stack and the disc stack is compressed. The friction pad is configured to generate shearing forces (e.g., due to relative rotation between the brake disc and the adjacent brake disc) when the friction pad engages the adjacent disc friction pad, causing a torque around the disc axis on the friction pad. The friction pad is configured to transfer this torque to the lining carrier.

In examples, the lining carrier includes an inner perimeter surrounding a aperture of the brake disc ("disc aperture") and an outer perimeter surrounding the inner perimeter. The disc axis of the brake disc may extend through the disc aperture, such that the inner perimeter and the outer perimeter rotate around the disc axis when the brake disc rotates around the disc axis. In examples, the carrier surface extends substantially between the inner perimeter and the outer perimeter, such that the carrier surface rotates around the disc when the brake disc rotates around the disc axis.

The friction pad defines a friction surface on a first side of the friction pad and a backing surface on a second side of the friction pad opposite the first side. The friction pad is configured such that, when the friction pad covers the carrier surface, the friction surface faces away from the carrier surface and the backing surface faces toward (for example, is in contact with) the carrier surface. The friction pad is configured such that, when the friction pad covers the carrier surface, the friction pad rotates around the disc axis when the lining carrier rotates around the disc axis. In examples, the friction pad defines a thickness ("pad thickness") between the friction surface and the backing surface. The pad thickness may be, for example, defined by a dimension measuring a displacement between the friction surface and the backing surface. In examples, the pad thickness is defined by a dimension substantially parallel to the disc axis of the brake disc when the friction pad is covering the carrier surface.

The brake disc (e.g., the lining carrier) defines a protrusion extending from the carrier surface. The protrusion is configured to facilitate the transfer of a torque around the disc axis from the friction pad to the lining carrier, and vice-versa. The friction pad includes a recess configured to receive the protrusion when the friction pad covers the portion of the carrier surface. In examples, recess extends from a recess opening in the backing surface and into a body of the friction pad ("friction pad body") in a direction from the backing surface toward the friction surface. The recess may be, for example, a volume defined in the friction pad body by a recess boundary of the friction pad. For example, the recess may be an open cavity defined by the recess boundary, and with the recess opening defining a single opening to the open cavity. In examples, the recess extends from the backing surface into the friction pad body over a distance less than the pad thickness, such that the recess does not extend to the friction surface of the friction pad.

The friction pad may be configured to transfer a torque around the disc axis (e.g., caused by contact with an adjacent disc friction pad) to the protrusion via the recess boundary. In examples, the recess boundary is configured to bear against (e.g., contact) the protrusion when the recess receives the protrusion and the friction pad experiences the torque around the disc axis. The friction pad may be configured such that the recess boundary transfers at least some portion of the torque to the protrusion, such that the protrusion transfers the portion of the torque to the lining carrier. For example, the torque on the friction pad may cause the receptable boundary to exert an action force on the protrusion, such that the force on the protrusion generates a torque on the lining carrier. The protrusion may generate a reaction force on the recess boundary opposing the action force, such that the friction pad remains substantially stationary relative to the lining carrier as the friction pad transfers the portion of the torque to the protrusion.

In examples, the friction pad may be configured to limit oxidation of the friction pad caused by an atmosphere surrounding the friction pad. For example, under certain conditions (e.g., during and/or following a braking operation of the brake assembly), the environment surrounding the brake disc may be an oxidated, high temperature environment leading to relatively accelerated rates of oxidation of the friction pad. The friction pad may be configured to engage the lining carrier to limit and/or shield portions of the friction pad body exposed to the atmosphere, for example, limit and/or reduce oxidation of the friction pad caused by the atmosphere. For example, the friction pad may be a unitary pad such as an annular ring configured to surround the disc aperture of the brake disc (e.g., an annular ring bounded by an outer perimeter and inner perimeter of the pad), such that exposure to edge surfaces substantially perpendicular to the disc axis is reduced and/or eliminated. In some examples, the friction pad may comprise a plurality of pad sectors configured to surround the disc aperture. A pad sector may be configured to abut one or more other pad sectors in in the plurality of pad sectors to substantially shield the abutting surface from the atmosphere surrounding the brake disc. The brake disc may be configured such that the recess boundary transfers torque to the protrusion in a manner allowing the brake disc to limiting exposure of friction pad surfaces to the surrounding environment.

The brake disc may define any number of protrusions, including a plurality of protrusions. The friction pad may define any number of recess boundaries including a plurality of recess boundaries defining a plurality of recesses. Each recess may be configured to receive one or more protrusions when the friction pad covers the carrier surface. The brake disc may be configured such that, when the friction pad receives a torque around the disc axis, the plurality of recess boundaries transfers at least some portion of the torque to the plurality of protrusions, such that the friction pad transfers torque to the lining carrier via the recess boundaries.

In examples, the brake disc includes at least one fastener (e.g., a rivet) configured to couple the friction pad to the lining carrier. The fastener may be configured to couple the friction pad to the lining carrier such that the friction surface faces away from the carrier surface and the backing surface faces toward (e.g., is in contact with) the carrier surface. In examples, the fastener is configured limit movement of the friction pad relative to the carrier surface in an axial direction of the brake disc, such that the fastener provides axial support to the friction pad. In examples, the fastener defines a fastener head configured to provide the axial support. The friction pad may define a countersink in the friction surface configured to receive the fastener head, such that the fastener head is substantially recessed relative to the friction surface.

The friction pad may be configured to transfer a torque around the disc axis to the lining carrier in a manner substantially limiting shear forces on the fastener. The friction pad may be configured such that, when the friction pad receives a torque around the disc axis, the friction pad transfers a majority and/or substantially all of the torque to the lining carrier via the recess boundary while limiting and/or eliminating transfer of the torque via the fastener. For example, the fastener (e.g., a fastener shank) may be configured to extend through a fastener access defined by the friction pad from the friction surface to the backing surface. The friction pad may be configured such that a cross-sectional dimension of the fastener access (e.g., an access diameter) and/or a cross-sectional dimension of the fastener (e.g., a fastener diameter) causes a gap between the fastener shank and a boundary of the fastener access. The gap may substantially limit and/or eliminates forces exchanged between the boundary of the fastener access and the fastener shank. The friction pad and/or fastener may be configured to substantially maintain the gap or some portion thereof as the recess boundary of the friction pad transfers torque to the protrusion of the lining carrier. Hence, the friction pad may be configured to transfer torque to the lining carrier via the recess boundary while substantially limiting shear forces on the fastener.

In examples, the carrier surface is defined on a first side of the lining carrier ("carrier first side") and the lining carrier defines a second carrier surface on a second side of the lining carrier ("carrier second side") opposite the carrier first side. In examples, the brake disc includes a second friction pad configured to cover the carrier second side.

In some examples, the friction pad is a unitary pad such as an annular ring configured to surround the disc aperture of the brake disc when the friction pad covers the portion of the carrier surface. In some examples, the friction pad comprises a plurality of pad sectors configured to surround the disc aperture of the brake disc. In examples, a pad sector is configured to abut one or more other pad sectors in the plurality, such that the pad sector may transfer a torque around the disc axis to the one or more other pad sectors. In examples, one or more of the pad sectors (e.g., each of the pad sectors) may define at least one recess. The lining carrier may define at least protrusion configured to insert into the recess when the pad sector covers a portion of the carrier surface.

Hence, provided here is a brake disc comprising a lining carrier defining a carrier surface and a friction pad configured to cover at least a portion of the carrier surface. The friction pad defines a recess configured to receive a protrusion extending from the lining carrier when the friction pad covers the portion of the carrier surface. The friction pad is configured to transfer a torque from a recess boundary of the recess to the protrusion. The protrusion is configured to transfer the torque to the lining carrier. In examples, a fastener is configured to couple the friction pad to the lining carrier. The friction pad may be configured to transfer the torque to the lining carrier in a manner that substantially limits shear forces exerted from the friction pad to the fastener. In examples, the brake disc is configured such that the recess boundary transfers torque to the protrusion in a manner allowing the brake disc to limiting exposure of friction pad surfaces to the surrounding environment.

FIG. 1 is a schematic cross-sectional view illustrating an example brake assembly 10 for a system 12 which includes a rotational component 14. Brake assembly 10 includes a plurality of rotor discs such as rotor disc 18, rotor disc 20, and rotor disc 22 interleaved with a plurality of stator discs such as stator disc 24 and stator disc 26. Rotor discs 18, 20, 22 and stator discs 24, 26, define a disc stack 30. Brake assembly 10 is configured to compress disc stack 30 such that rotor discs 18, 20, 22 and stator discs 24, 26 frictionally engage to reduce and/or limit a rotation of rotational component 14 around and/or around a system axis AS.

Rotational component 14 is configured to rotate relative to a torque tube 32 of brake assembly 10. Rotational component 14 may be, for example, a wheel of a vehicle, a pulley such as a windlass pulley, or some other rotational component of a system such as system 12. Torque tube 32 may be coupled to a structure 34 of system 12 configured to remain substantially rotationally stationary relative to rotational component 14, such that torque tube 32 remains substantially rotationally stationary when rotational component 14 rotates around system axis AS. Brake assembly 10 is configured to generate a torque to oppose a rotation of rotational component 14 around system axis AS and transfer the torque to rotational component 14, reducing and/or eliminating the rotation of rotational component 14 around system axis AS. Structure 34 may be, for example, an axle or axial assembly of wheel, a portion of a windlass coupled to a platform such as a ship or other vehicle, or some other structure of system 12 configured to remain substantially rotationally stationary relative to rotational component 14. In examples, rotational component 14 and/or torque tube 32 are configured to surround system axis AS.

Brake assembly 10 and/or system 12 may include one or more rotor drive keys such as rotor drive key 36 configured to rotate around system axis AS when rotational component 14 rotates around system axis AS. In examples, rotor drive key 36 extends in a direction substantially parallel to system axis AS. Rotor drive key 36 and rotational component 14 are configured to be substantially stationary with respect to each other, such that when rotational component 14 rotates around system axis AS, rotor drive key 36 (and/or other rotor drive keys within brake assembly 10 and/or system 12) translates over a closed path around system axis AS. Consequently, when rotational component 14 and rotor drive key 36 are rotating around system AS, a force on rotor drive keys 36 opposing a direction of rotation of rotational component 14 acts to slow or cease the rotation. Rotor drive keys 36 may be configured to receive a torque from brake assembly 10 configured to reduce and/or cease a rotation of rotational component 14. Rotor drive key 36 (and/or other rotor drive keys within brake assembly 10 and/or system 12) may be integrally formed with rotational component 14, or may be separate from and mechanically affixed to rotational component 14.

One or more of rotor discs 18, 20, 22 (e.g., rotor disc 18) may be rotationally coupled to rotor drive key 36 and/or rotational component 14 such that rotor disc 18 rotates substantially synchronously with rotor drive key 36 and/or rotational component 14 around system axis AS. In examples, rotor disc 18 defines one or more drive slots (e.g., disc slot 78, 80 (FIG. 2)) configured to engage rotor drive key 36. Rotor drive key 36 may be configured to substantially extend through the drive slot such that, for example, rotor drive key 36 may transfer a torque from rotational component 14 to rotor disc 18 via the drive slot, and/or transfer a torque from rotor disc 18 to rotational component 14 via the drive slot. Hence, rotor discs 18, 20, 22 may be rotationally coupled to and rotate substantially synchronously with rotational component 14 around system axis AS.

One or more of stator discs 24, 26 (e.g., stator disc 24) may be rotationally coupled to torque tube 32 and/or structure 34 such that stator disc 24, 26 remains substantially rotationally stationary with respect to torque tube 32 and/or structure 34 as rotor discs 18, 20, 22 rotate substantially synchronously with rotor drive key 36 and/or rotational component 14 around system axis AS. In examples, stator disc 24, 26 defines one or more spline slots (e.g., one an inner perimeter of stator disc 24, 26) configured to engage a spline 38 of torque tube 32. Spline 38 may be configured to substantially extend through the spline slot such that, for example, spline 38 may transfer a torque from stator disc 24 to torque tube 32 via the spline slot, and/or transfer a torque from torque tube 32 to stator disc 24 via the spline slot. Hence, stator discs 24, 26 may be configured to remain substantially rotationally stationary with respect to torque tube 32 as rotational component 14 and rotor discs 18, 20, 22 rotate around system axis AS.

Rotor discs 18, 20, 22, and/or stator discs 24, 26 may have any suitable configuration. For example, rotor discs 18, 20, 22 and/or stator discs 24, 26 can each be substantially annular discs surrounding torque tube 32. In examples, each of rotor discs 18, 20, 22 and/or stator discs 24, 26 include an inner perimeter defining an disc aperture. Rotor discs 18, 20, 22 and/or stator discs 24, 26 may be configured such that torque tube 32 extends through the disc aperture when rotor discs 18, 20, 22 and/or stator discs 24, 26 surround torque tube 32. In examples, rotor discs 18, 20, 22 are slidably engaged (e.g., slip fit) with rotor drive key 36, such that rotor discs 18, 20, 22 may translate relative to rotor drive key 36, rotational component 14, and/or torque tube 32 in a direction substantially parallel to system axis AS. In examples, stator discs 24, 26 are slidably engaged (e.g., slip fit) with spline 38, such that stator discs 24, 26 may translate relative to rotor drive key 36, rotational component 14, and/or torque tube 32 in a direction substantially parallel to system axis AS. In the example of FIG. 1, disc stack 30 is depicted with three rotor discs and two stator discs. However, a different number of rotors and/or stators may be included in disc stack 30 in other examples.

Brake assembly 10 may include an actuator 40 is configured to compress disc stack 30 to bring friction surfaces of rotor discs 18, 20, 22 into contact with friction surfaces of stator discs 24, 26. In some examples, actuator 40 is configured to compress disc stack 30 using a pressure plate 42. Pressure plate 42 may be configured to translate relative to rotor drive key 36, rotational component 14, and/or torque tube 32 in a direction substantially parallel to system axis AS. Actuator 40 is configured to cause a piston 44 to translate relative to a body 46 of actuator 40 to compress disc stack 30. Actuator 40 may cause piston 44 to translate using any suitable method. In some examples, actuator 40 is configured to cause translation of piston 44 by supplying and/or venting a pressurized hydraulic fluid to or from a piston chamber. In addition or instead, in some examples, actuator 40 is configured to cause piston 44 to translate through a motion (e.g., a rotary motion) generated by an electric motor. In the example shown in FIG. 1, actuator 40 is configured to compress disc stack 30 against a backing plate 48. Backing plate may be configured to remain substantially stationary with respect to torque tube 32 and/or structure 34 (e.g., as actuator 40 causes the translation of pressure plate 42).

Contact of the friction surfaces of rotor discs 18, 20, 22 and the friction surfaces of stator discs 24, 26 may generate shearing forces between the discs. For example, contact of the friction surfaces may generate the shearing forces when rotational component 14 is rotating with respect to torque tube 32, such that rotor discs 18, 20 22 rotate with respect to stator discs 24, 26. The shearing forces may generate a torque (e.g., around system axis AS) on the friction surfaces of rotor discs 18, 20, 22 and/or stator discs 24, 26. In examples, one or more of the friction surfaces are defined by a friction pad, such as a pad comprising carbon and/or a carbon-composite. When the friction pad is supported by a lining carrier of a brake disc, the friction pad may need to effectively transfer the torque generated by the shearing force to the lining carrier in order for the brake disc to effectively cause and/or contribute to braking of a rotational component such as rotational component 17.

In examples, one or more of rotor discs 18, 20, 22 and/or stator discs 24, 26 is a brake disc which includes a lining carrier supporting a friction pad. The lining carrier is configured such that the friction pad engages an adjacent disc friction pad when actuator 40 compresses disc stack 30. The friction pad is configured such that engagement of the adjacent disc friction pad causes a torque on the friction pad, which the friction pad transfers to the lining carrier. The brake disc (e.g., the lining carrier) defines a protrusion extending from a carrier surface of the lining carrier and configured to insert into a recess of the friction pad to, for example, facilitate the transfer of at least some portion of the torque from the friction pad to the lining carrier. In examples, the friction pad is configured to transfer the torque to the lining carrier in a manner substantially limiting shear forces on a fastener coupling the friction pad to the lining carrier.

Figure 2:
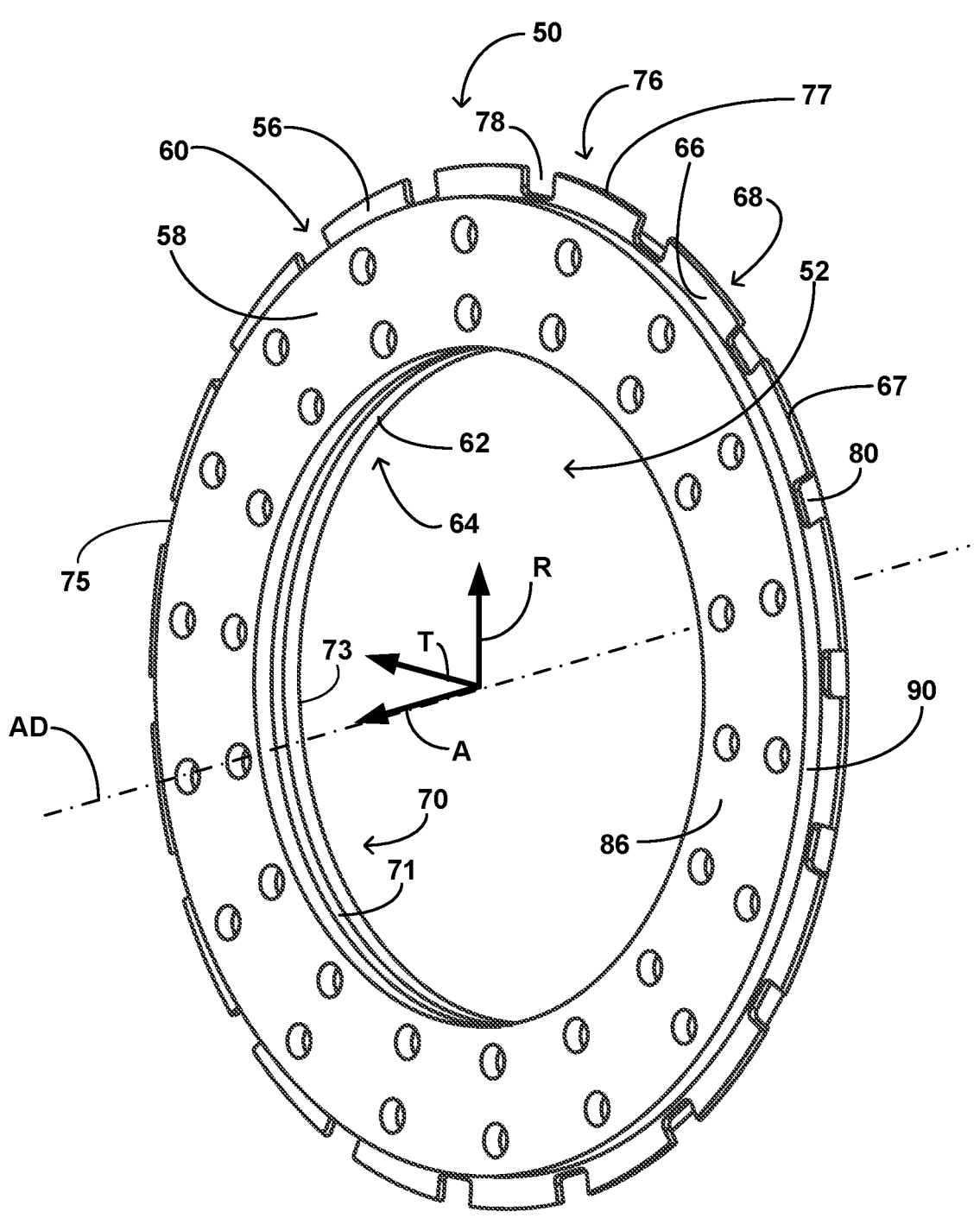
FIG. 2 is a perspective view illustrating an example brake disc.

For example, FIG. 2 is a schematic illustration illustrating an example brake disc 50, which is an example of one or more brake discs within disc stack 30 (FIG. 1). For example, brake disc 50 may be an example of one or more of rotor discs 18, 20, 22. Brake disc 50 defines an disc aperture 52 extending through brake disc 50. Disc aperture 52 is configured to allow rotation of brake disc 50 around disc axis AD. Disc axis AD be may substantially parallel and/or coincident with system axis AS when brake disc 50 is a brake disc within disc stack 30 (FIG. 1). Brake disc 50 includes a lining carrier 56 and a friction pad 58 covering a carrier surface 60 of lining carrier 56. Brake disc 50 may include a second friction pad 62 covering a second carrier surface 64.

Although friction pad 58 is described mainly below, configurations of second friction pad 62 individually and with reference to lining carrier 56, one or more protrusions, one or more fasteners, and/or other components and/or portions of brake disc 50 may be the same and/or similar to configurations described for friction pad 58 individually and/or relative to lining carrier 56, fastener 124, protrusion 92, and/or the other components and/or portions of brake disc 50.

Carrier surface 60 may be a surface defined by first side 66 of lining carrier 56 ("first carrier side 66"). Second carrier surface 64 may be a surface defined by second side 68 of lining carrier 56 ("second carrier side 68") opposite first carrier side 66. In examples, lining carrier 56 includes a body 67 ("lining carrier body 67") defining first carrier side 66 and second carrier side 68. In examples, first carrier side 66 is displaced from second carrier side 68 in an axial direction A of brake disc A. In examples, some portion of lining carrier body 67 separates first carrier side 66 and second carrier side 68. Carrier surface 60 may be defined by a portion of or substantially the entirety of first carrier side 66. Second carrier surface 66 may be defined by a portion of or substantially the entirety of second carrier side 68.

Here and elsewhere, an axial direction of a brake disc means the direction of a vector parallel to an axis extending through disc aperture 54 of brake disc 50. For example, FIG. 2 illustrates disc axis AD extending through central aperture 374. An axial direction A of brake disc 50 is the direction of a vector coincident with axis A. A radial direction R of brake disc 50 means the direction of a vector perpendicular to and intersecting the axis extending through central aperture 374. A tangential direction T of brake disc 50 means the direction of a vector perpendicular to axial direction A and perpendicular to radial direction R of the brake disc. Although illustrated as a right-hand-coordinate axis in FIG. 2, in examples, axial direction A, radial direction R, and tangential direction T may have directions (either individually or as a group) opposite to those shown in FIG. 2.

Figure 3:
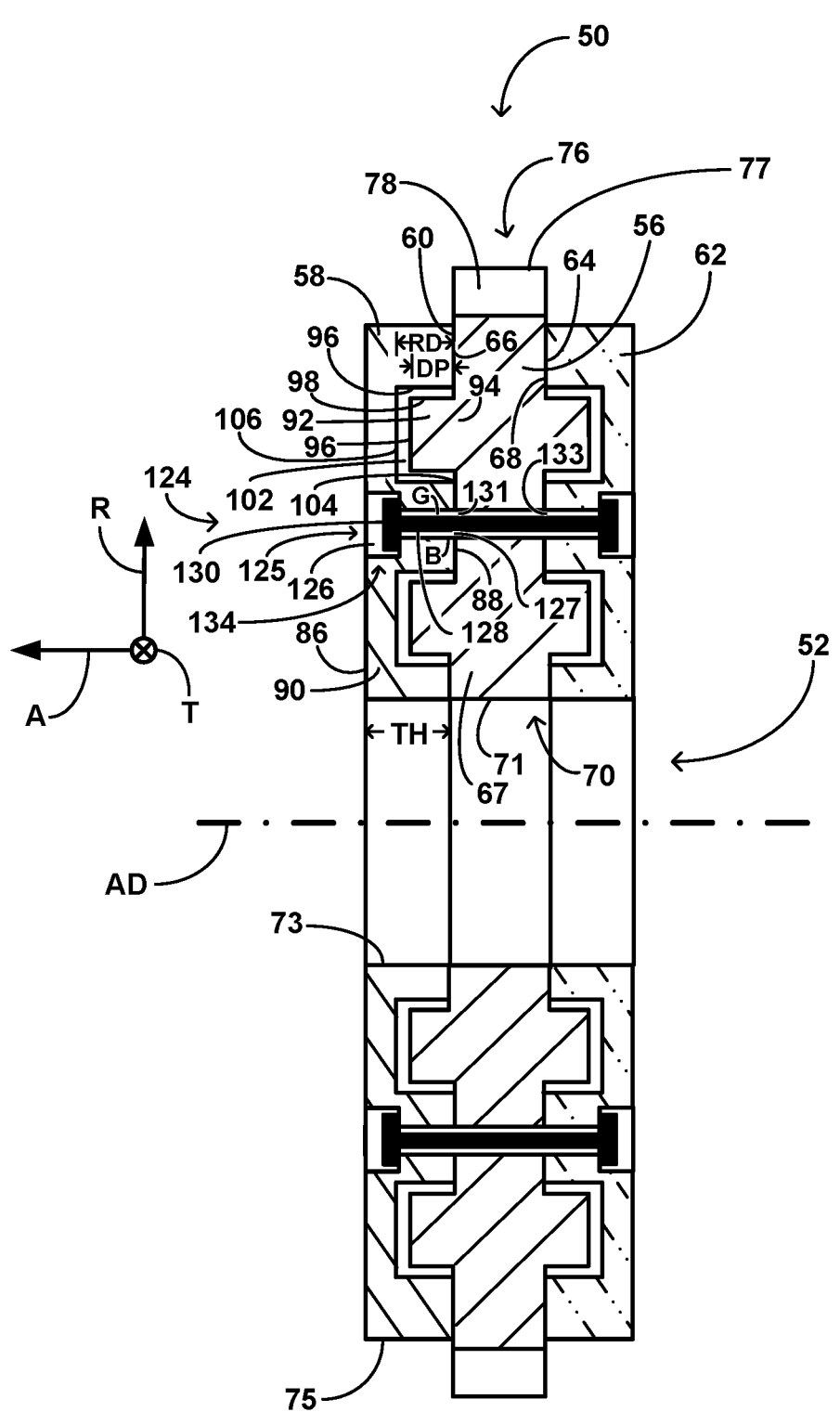
FIG. 3 is a schematic cross-section view of an example brake disc, with the cutting plane taken parallel to a plane defined by an axial direction and a radial direction of the brake disc.
Figure 4:
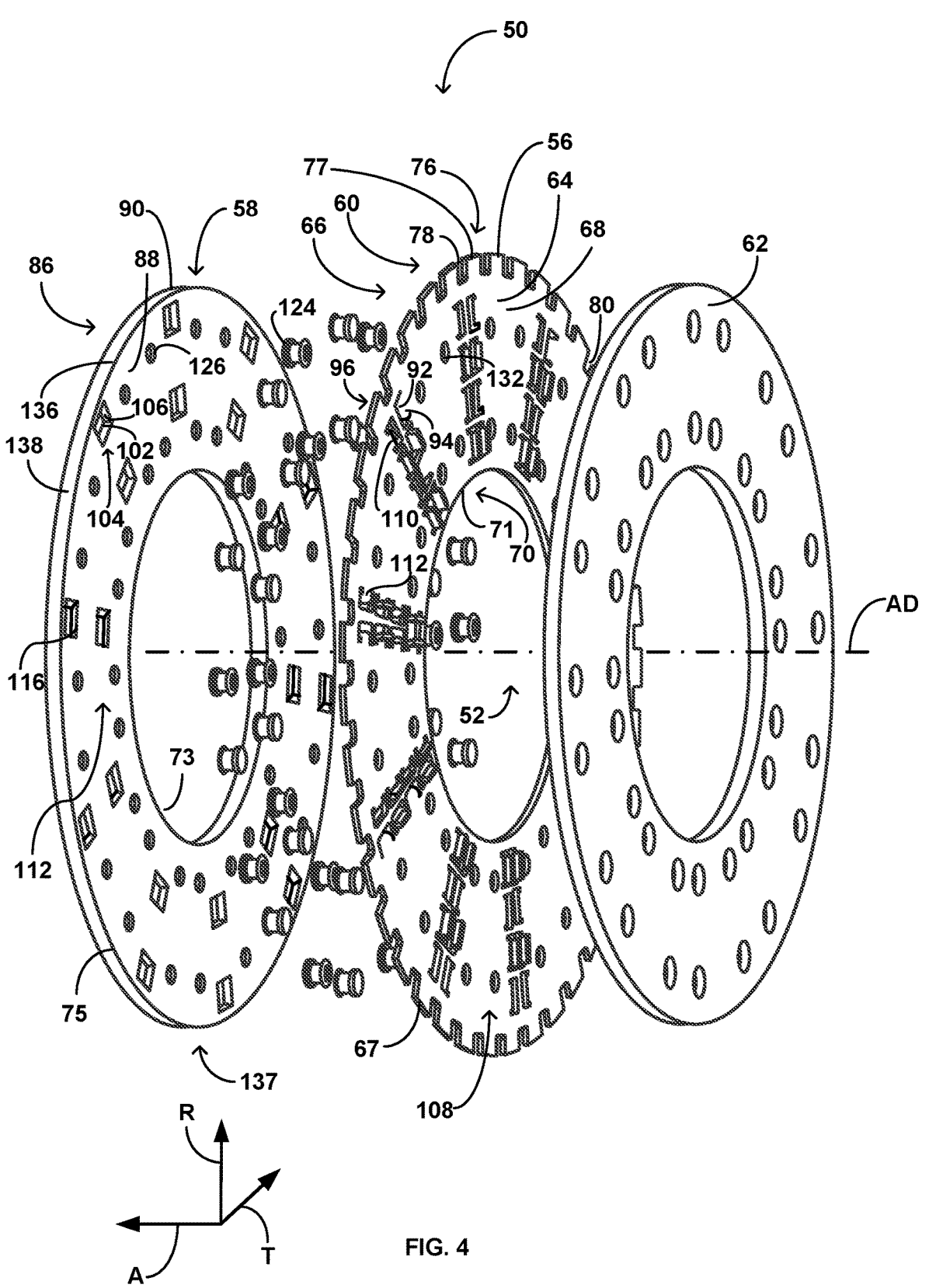
FIG. 4 is an exploded view of an example brake disc including a plurality of friction pads and lining carrier.
Figure 5:
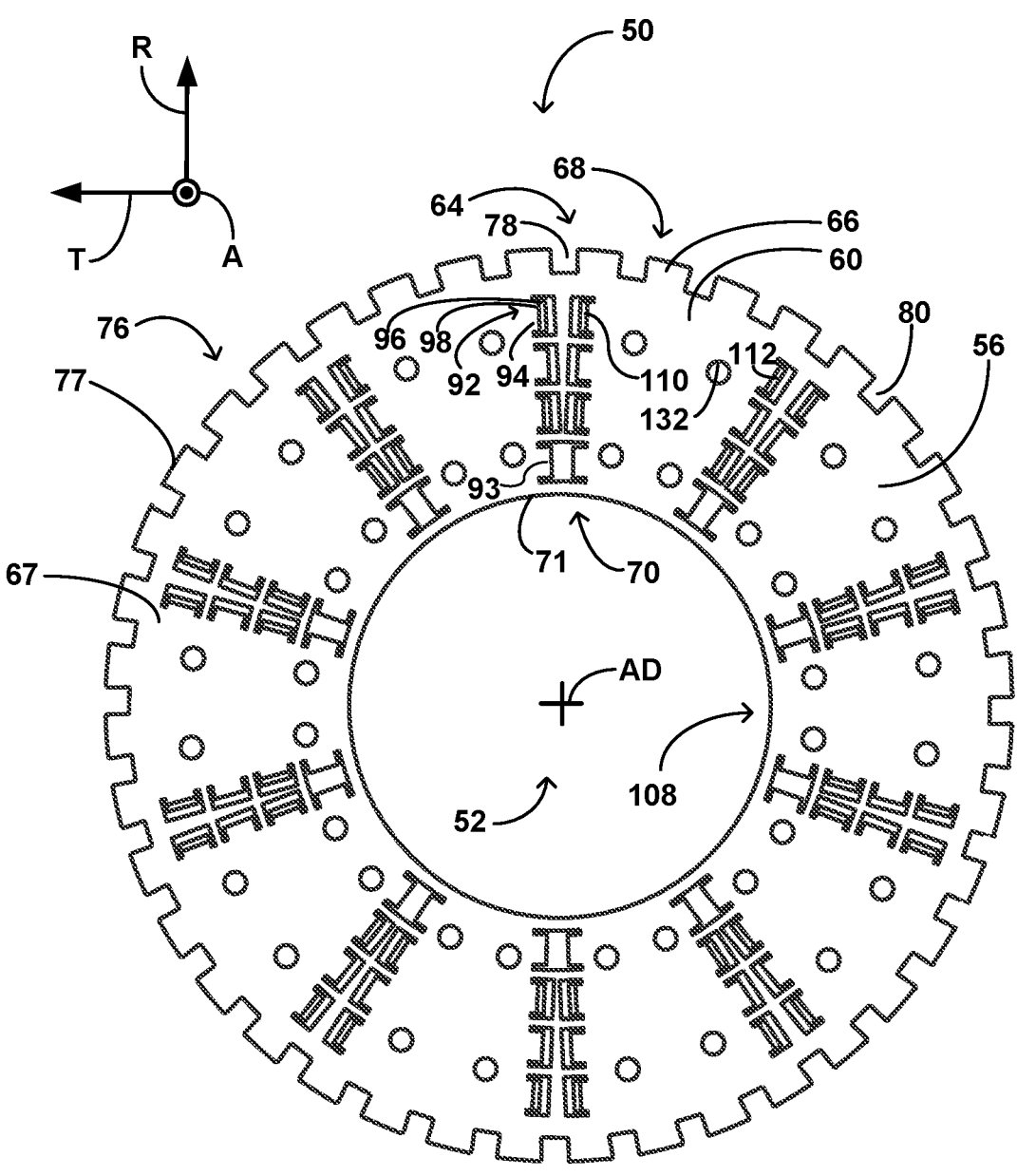
FIG. 5 is a schematic plan view illustrating an example lining carrier.

FIG. 3 is a schematic cross-sectional side view of brake disc 50 taken over a cutting plane parallel to a plane defined by axial direction A and radial direction R and passing through disc axis AD. In FIG. 3, tangential direction T is perpendicular to and proceeding in to the page, and axial direction A and radial direction R are parallel to the page. FIG. 4 is an exploded view of brake disc 50, showing lining friction pad 58 and second friction pad 62 displaced from lining carrier 56, with axial direction A, radial direction R, and tangential direction T illustrated for reference. FIG. 5 is a schematic plan view of lining carrier 56, with axial direction A perpendicular to and proceeding out of the page, and radial direction R and tangential direction T parallel to the page.

Disc aperture 52 may be defined by an inner perimeter 70 of brake disc 50 ("disc inner perimeter 70"). In examples, an inner perimeter 71 of lining carrier 56 ("lining inner perimeter 71") defines disc aperture 52. Brake disc 50 may be configured such that disc inner perimeter 70 and/or lining inner perimeter 71 surround system axis A when brake disc 50 is surrounding disc axis AD. Brake disc 50 may be configured such that disc axis AD extends through disc aperture 52 when brake disc 50 is surrounding disc axis AD.

Brake disc 50 includes an outer perimeter 76 ("disc outer perimeter 76"). In examples, an outer perimeter 77 of lining carrier 56 ("lining outer perimeter 77") defines at least some portion of disc outer perimeter 76. Disc outer perimeter 76 may surround disc inner perimeter 70. In examples, carrier surface 60 is at least a portion of first carrier side 66 positioned between disc inner perimeter 70 (e.g., lining inner perimeter 71) and disc outer perimeter 76 (e.g., lining outer perimeter 77). In examples, second carrier surface 64 may be at least a portion of second carrier side 68 positioned between disc inner perimeter 70 (e.g., lining inner perimeter 71) and disc outer perimeter 76 (e.g., lining outer perimeter 77).

In examples, friction pad 58 defines an inner perimeter 73 ("pad inner perimeter 73") and/or an outer perimeter 75 ("pad outer perimeter 75"). Pad outer perimeter 75 may surround pad inner perimeter 73. In examples, brake disc 50 is configured such that pad inner perimeter 73 and/or pad outer perimeter 75 surround system axis A when brake disc 50 is surrounding disc axis AD. In some examples, pad inner perimeter 73 defines at least a portion of disc inner perimeter 70 and/or disc aperture 52. In examples, disc inner perimeter 70, disc outer perimeter 76, lining inner perimeter 71, lining outer perimeter 77, pad inner perimeter 73, and/or pad outer perimeter 75 are substantially perpendicular to disc axis AD (e.g., perpendicular or nearly perpendicular to the extent permitted by manufacturing tolerances). In examples, disc inner perimeter 70, disc outer perimeter 76, lining inner perimeter 71, lining outer perimeter 77, pad inner perimeter 73, and/or pad outer perimeter 75 are substantially parallel to a plane defined by the axial direction A and the radial direction R of brake disc 50 (e.g., parallel or nearly parallel to the extent permitted by manufacturing tolerances).

Brake disc 50 (e.g., lining carrier 56) further defines a plurality of disc slots around disc outer perimeter 76. The plurality of disc slots comprises, for example, disc slot 78 and disc slot 80, as well as others similarly depicted. Disc slot 78 and/or disc slot 80 may be drive slots configured to transfer to a torque to and/or from a rotor drive key (e.g., rotor drive key 36 (FIG. 1)) extending through disc slot 78 or disc slot 80. In examples, brake disc 50 may define the plurality of disc slots around disc inner perimeter 70. For example, brake disc 50 (e.g., lining carrier 56) may define one or more spline slots on inner perimeter 70. The one or more spline slots may be configured to transfer a torque to and/or from a spline (e.g., spline 38 (FIG. 1)) extending through one or more of the spline slots.

Friction pad 58 is configured to cover carrier surface 60. Friction pad 58 and/or lining carrier 56 are configured such that, when friction pad 58 covers the carrier surface 60, friction pad 58 rotates around disc axis AD when lining carrier 56 rotates around disc axis AD. Lining carrier 56 is configured such that friction pad 58 engages an adjacent disc friction pad when brake disc 50 is one or rotor discs 18, 20, 22 or stator disc 24, 26 and disc stack 30 is compressed (e.g., by actuator 40) (FIG. 1). Friction pad 58 is configured to generate shearing forces when friction pad 58 engages the adjacent disc friction pad, causing a torque around disc axis AD on friction pad 58. Friction pad 58 is configured to transfer a torque around disc axis AD (e.g., caused by the shearing force) to lining carrier 56.

Friction pad 58 defines a friction surface 86 on a first side of friction pad 58 and a backing surface 88 on a second side of friction pad 58 opposite the first side. In examples, friction pad 58 includes a body 90 ("friction pad body 90") defining friction surface 86 and backing surface 88. In examples, friction pad 58 is configured such that friction surface 86 is displaced from backing surface 88 in the axial direction A of brake disc 50. In examples, at least some portion of friction pad body 90 separates friction surface 86 and backing surface 88. In examples, friction pad 58 (e.g., friction pad body 90) defines a pad thickness TH (FIG. 3) between friction surface 86 and backing surface 88. Friction pad 58 is configured such that, when friction pad 58 covers carrier surface 60, friction surface 86 faces in a direction away from carrier surface 60 and backing surface 88 faces in a direction toward (e.g., is in contact with) carrier surface 60.

Figure 6:
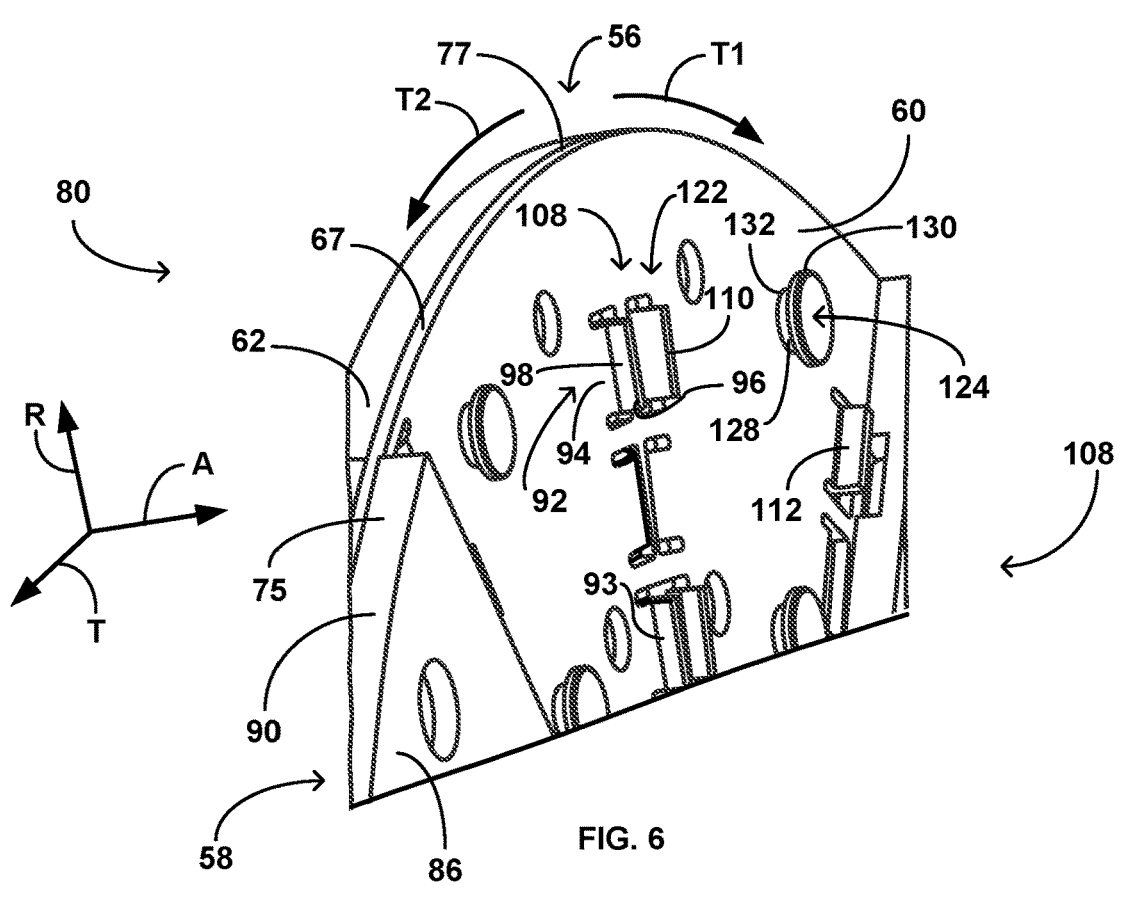
FIG. 6 is a perspective view illustrating of portion of a lining carrier defining a protrusion and a portion of a friction pad coupled to the lining carrier.

Brake disc 50 (e.g., lining carrier 56) defines a protrusion 92 extending from carrier surface 60. In FIG. 4, carrier surface 60 substantially faces friction pad 58 and protrusion 92 is depicted as extending in a direction from carrier surface 60 toward friction pad 58. In FIG. 5, protrusion 92 is depicted as extending from carrier surface 60 out of the page. In FIG. 6, protrusion 92 is depicted as extending from carrier surface 60 with a direction outward from and at an oblique angle to the page.

Protrusion 92 is configured to facilitate the transfer of a torque around disc axis AD imparted on friction pad 58 from friction pad 58 to lining carrier 56, and vice-versa. For example, protrusion 92 may be configured to facilitate the transfer of a torque caused by engagement of friction surface 86 with an adjacent disc friction pad from friction pad 58 to lining carrier 56. Protrusion 92 may be configured such that, when protrusion 92 receives a torque around disc axis AD from friction pad 58, protrusion 92 transmits at least some portion of the torque to lining carrier body 67. Protrusion 92 may be configured such that, when lining carrier body 67 imparts and/or transfers a torque around disc axis AD to protrusion 92, protrusion 92 transmits at least some portion of the torque to friction pad 58.

For example, FIG. 6 is a schematic illustration illustrating a portion of brake disc 50 including a portion of lining carrier 56, a portion of friction pad 58, and a portion of second friction pad 62. A section of friction pad 58 is removed to illustrate the underlying carrier surface 60. The axes depicting the axial direction A, radial direction R, and tangential direction T of FIGS. 2-5 are included for reference.

Protrusion 92 may, for example, a tab or other protrusion extending from carrier surface 60 in the axial direction A of brake disc 50. For example, protrusion 92 may include a fixed end 94 attached to lining carrier body 67 and a free end 96 displaced from fixed end 94 in the axial direction A of brake disc 50. Protrusion 92 may be configured to define a displacement DP (FIG. 3) from free end 96 to fixed end 94 and/or carrier surface 60 (e.g., a displacement DP in the axial direction A). Protrusion 92 may include, for example, a cut out and bent portion of carrier surface 60, a pin or other member extending from carrier surface 60, or some other arrangement configured to define protrusion 92. In examples, protrusion 92 defines a bearing surface 98 ("protrusion bearing surface 98") configured to engage friction pad 58 when protrusion 92 facilitates the transfer of torque from friction pad 58 to lining carrier 56. In examples, carrier surface 60 is a planar surface extending in the radial direction R and the tangential direction T of brake disc 50.

Figure 7:
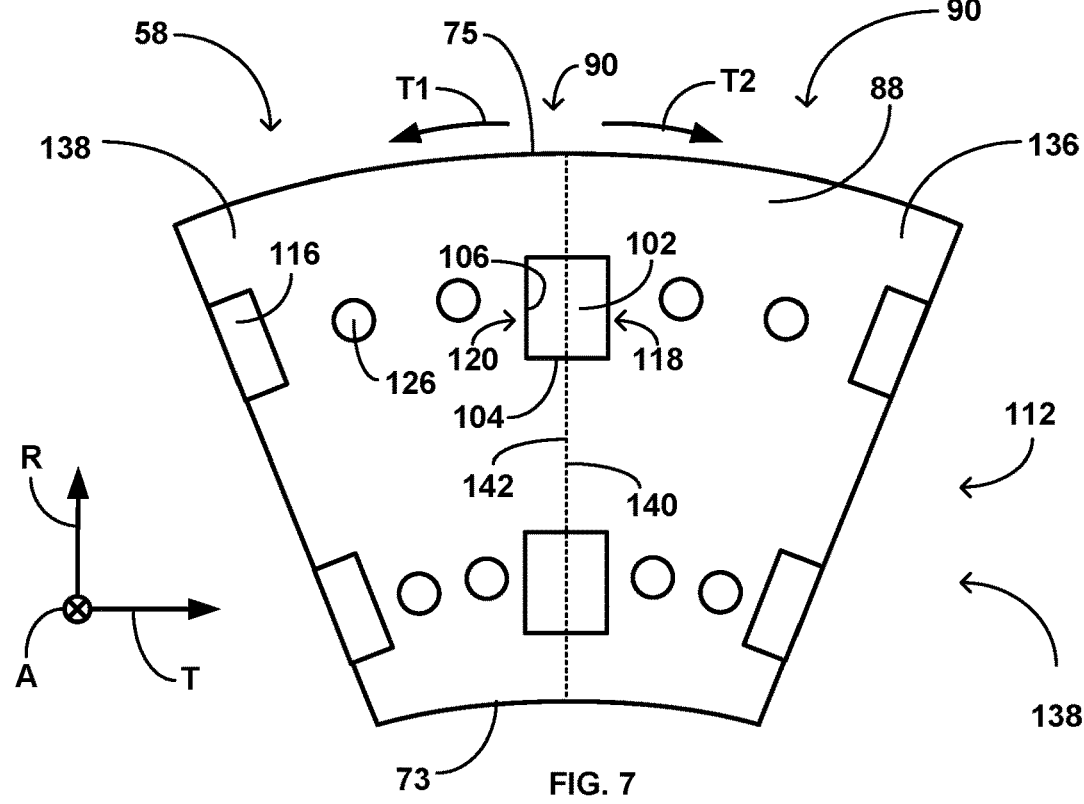
FIG. 7 is a schematic plan view of a portion of a backing surface of a friction pad defining a recess.

Friction pad 58 defines a recess 102 configured to receive protrusion 92 when friction pad 58 covers the carrier surface 60. For example, FIG. 7 is a schematic illustration of a portion of friction pad 58 illustrating backing surface 88 and recess 102. The axes depicting the axial direction A, radial direction R, and tangential direction T of FIGS. 2-6 are included for reference. The axes of FIG. 7 are oriented such as would be expected when backing surface 88 is facing toward carrier surface 60 of FIG. 6, such that axial direction A proceeds into the page as radial direction R and tangential direction T are parallel to the page.

Friction pad 58 is configured such that, when backing surface 88 covers (e.g., engages and/or contacts) carrier surface 60 of brake disc 50, recess 102 receives protrusion 92. For example, protrusion 92 may insert into recess 102 when backing surface covers carrier surface 60. In examples, recess 102 is a volume extending from backing surface 88 into friction pad body 90 substantially in the axial direction A of brake disc 50. In examples, friction pad 58 defines a recess opening 104 surrounded by backing surface 88. Recess 102 may extend from recess opening 104 and into friction pad body 90 such that, for example, recess 102 defines a volume (e.g., a cavity) opening to backing surface 88. In examples, friction pad 58 defines a recess boundary 106 which defines at least the portion of recess 102 extending from recess opening 104 and into friction pad body 90. For example, recess 102 may be an open cavity defined by recess boundary 106, such that recess opening 104 defines a single opening to the open cavity. In examples, recess 102 extends from backing surface 88 into friction pad body 90 over a recess depth RD (e.g., a distance in the axial direction A) less than the pad thickness TH (FIG. 3) of friction pad 58. In examples, recess 102 is configured such that recess 102 does not extend to friction surface 86. In examples, recess depth RD is less than or equal to displacement DP defined by protrusion 92. In examples, recess 102 is configured such that recess boundary 106 surrounds protrusion 92 when recess 102 receives protrusion 92.

Friction pad 58 may be configured to impart a torque around disc axis AD to protrusion 92 via recess boundary 106 (e.g., when the torque is imparted on friction pad 58 due to, for example, engagement with an adjacent disc friction surface). For example, friction pad 58 may be configured to impart a torque to protrusion 92 via recess boundary 106 when brake disc 50 engages an adjacent disc in disc stack 30 during a braking operation of brake assembly 10 (FIG. 1), causing shearing forces on friction surface 86 and a torque around disc axis AD on friction pad body 90. Friction pad body 90 may be configured to transfer some portion of the torque to recess boundary 106, such that recess boundary 106 transfers the portion of torque to protrusion 92. In examples, recess boundary 106 is configured to bear against (e.g., contact) protrusion 92 (e.g., protrusion bearing surface 98) when recess 102 receives protrusion 92 and friction pad 58 imparts the portion of the torque to protrusion 92. Protrusion 92 may be configured to transfer the portion of the torque to lining carrier body 67. Lining carrier body 67 may be configured to transfer the portion of the torque to a spline (e.g., spline 38 (FIG. 1)) or a rotor drive key (e.g., rotor drive key 36 (FIG. 1)) via a disc slot (e.g., a disc slot defined on disc outer perimeter 76 or disc inner perimeter 70). For example, the torque on friction pad 58 may cause recess boundary 106 to exert an action force on protrusion 92, such that the force on protrusion 92 generates a torque on lining carrier 56 (e.g., lining carrier body 67). Protrusion 92 may generate a reaction force on recess boundary 106 opposing the action force, such that friction pad 58 remains substantially stationary relative to lining carrier 56 as friction pad 58 transfers the portion of the torque to protrusion 92.

Lining carrier 56 may define any number of protrusions configured to insert into recesses defined by friction pad 58. For example, lining carrier 56 may define a plurality of protrusions 108 ("protrusions 108") which includes protrusion 92 and other protrusions, such as protrusion 110, protrusion 112, and others similarly depicted. Friction pad 58 may define any number of recesses configured to receive one or more protrusions of protrusions 108. For example, friction pad 58 may define a plurality of recesses 114 ("recesses 114") which includes recess 102 and other recesses, such as recess 116 and others similarly depicted. Brake disc 50 may be configured such that, when friction pad 58 receives a torque around disc axis AD (e.g., due to engagement with an adjacent disc friction pad), the recess boundaries of recesses 114 transfer at least some portion of the torque to protrusions 108, such that friction pad 58 transfers torque to lining carrier 56 (e.g., lining carrier body 67) via the recess boundaries of recesses 114.

In examples, protrusions 108 include two or more protrusions such as protrusion 92 and protrusion 93 which are configured to align radially with respect to brake disc 50, such that a radial vector extending from longitudinal axis L in a radial direction R of brake disc 50 intersects both protrusion 92 and protrusion 93. In some examples, protrusions 108 include two or more protrusions such as two or more of protrusion 92, protrusion 110, and/or protrusion 112 which are configured to align tangentially with respect to brake disc 50, such that a circular perimeter defined on carrier surface 60 and centered on longitudinal axis L intersects two or more of protrusion 92, protrusion 110, and/or protrusion 112.

Each of recesses 114 may be configured to receive one or more of protrusions 108 when friction pad 58 covers carrier surface 60 (e.g., when backing surface 88 engages carrier surface 60). For example, recess 102 (FIG. 7) may be configured to receive protrusion 92 and protrusion 110 (FIG. 6) when friction pad 58 covers carrier surface 60. Recesses 114 may be configured such that recess boundary 106 imparts a torque to either of protrusion 92 or protrusion 110 or both of protrusion 92 and protrusion 110 when friction pad 58 receives a torque around disc axis AD. For example, recess boundary 106 may be configured to impart at least some portion of a torque T1 around disc axis AD to protrusion 92 when friction pad 58 receives the torque T1. Recess boundary 106 may be configured to impart at least some portion of a torque T2 around disc axis AD to protrusion 110 when friction pad 58 receives the torque T2.

In examples, recess boundary 106 includes a first portion 118 ("first boundary portion 118") and a second portion 120 ("second boundary portion 120") displaced from first boundary portion 118 in the tangential direction T of brake disc 50. Recess 102 may be configured such that first boundary portion 118 imparts a torque to protrusion 92 when friction pad 58 receives a torque around disc axis AD in the direction of the torque T1. Recess 102 may be configured such that second boundary portion 120 imparts a torque to protrusion 110 when friction pad 58 receives a torque around disc axis AD in the direction of the torque T2. In examples, recess boundary 106 is configured such that protrusion 92 (e.g., protrusion bearing surface 98) and/or a protrusion bearing surface 122 of protrusion 110 contacts recess boundary 106 when friction pad (e.g., backing surface 88) covers and/or engages carrier surface 60. For example, protrusion 92 may contact first boundary portion 118 and/or protrusion 110 may contact second boundary portion 120 when friction pad (e.g., backing surface 88) covers and/or engages carrier surface 60.

Friction pad 58 is configured to couple to lining carrier 56 to limit and/or substantially eliminate movement of friction pad 58 relative to lining carrier 56 (e.g., carrier surface 60) in the axial direction A of brake disc 50. For example, friction pad 58 may be coupled to lining carrier 56 by a fastener, an adhesive, welding, soldering, or another method sufficient to limit and/or substantially eliminate movement of friction pad 58 relative to lining carrier 56 in the axial direction A. In examples, friction pad 58 is coupled to lining carrier 56 such that when lining carrier 56 exerts a first force (e.g., an action force) on friction pad 58 in a first axial direction of the wheel, friction pad 58 experiences a second force (e.g., a reaction force) opposing the first force, such that movement of friction pad 58 relative to lining carrier 56 is limited and/or substantially eliminated. In examples, brake disc 50 is configured such that lining carrier 56 exerts the first force on friction pad 58 via carrier surface 60 of lining carrier 56 when friction pad 58 is covering carrier surface 60. Brake disc 50 may be configured such that friction pad 58 exerts the second force on lining carrier 56 via backing surface 88 of friction pad 58 when friction pad 58 is covering carrier surface 60. In examples, carrier surface 60 is configured to contact backing surface 88 when friction pad 58 is covering carrier surface 60, such that the first force and the second force are contact forces between carrier surface 60 and backing surface 88.

In examples, brake disc 50 includes at least one fastener 124 (FIGS. 3, 4, 6) configured to couple friction pad 58 and lining carrier 56. In examples, fastener 124 is a rivet or other fastener configured to mechanically couple friction pad 58 to lining carrier 56. Fastener 124 may be configured to couple friction pad 58 to lining carrier 56 such that friction surface 86 faces away from carrier surface 60 and backing surface 88 faces toward (e.g., is in contact with) carrier surface 60. Fastener 124 may be configured limit movement of friction pad 58 relative to carrier surface 60 in the axial direction A (e.g., the first axial direction and/or the second axial direction) of brake disc 50, such that fastener 124 provides axial support to friction pad 58. In examples, brake disc 50 is configured such that, when lining carrier 56 exerts the first force (e.g., the action force) on friction pad 58, fastener 124 exerts the second force (e.g., the reaction force) on friction pad 58 to limit and/or substantially eliminate movement of friction pad 58 relative to carrier surface 60 in the axial direction A of brake disc 50. Fastener 124 or another fastener may be configured to limit and/or substantially eliminate movement of friction pad 58 relative to carrier surface 60 in the radial direction R and/or tangential direction T of brake disc 50.

Friction pad 58 (e.g., friction pad body 90) may define a hole 126 ("pad hole 126") configured to allow passage of fastener 124 (e.g., a fastener shank 128) through friction pad 58 to secure friction pad 58 to lining carrier 56. Friction pad 58 may be configured such that a portion of friction pad body 90 positions between a head 130 of fastener 124 ("fastener head 130") and lining carrier 56 (e.g., carrier surface 60) when fastener 124 secures friction pad 58 to lining carrier 56. For example, pad hole 126 may be configured (e.g., dimensioned) to allow passage of fastener shank 128 through friction pad body 90 and into lining carrier 56 while preventing passage of fastener head 130 through friction pad body 90, such a portion of friction pad 58 is trapped (e.g., positions) between fastener head 130 and lining carrier 56. In examples, friction pad 58 defines pad hole 126 such that pad hole 126 extends (e.g., provides a passage from) friction surface 86 to backing surface 88. In examples, pad hole 126 opens to friction surface 86 at a first opening 125 ("first pad hole opening 125") and opens to backing surface 88 at a second opening 127 ("second pad hole opening 127").

Fastener 124 may define fastener head 130 at an end and/or end portion of fastener shank 128. In examples, first pad hole opening 125 and/or second pad hole opening 127 defines a curved shape such as a circle, oval, or other curved shape. In some examples, first pad hole opening 125 and/or second pad hole opening 127 defines a curvilinear shape comprising curved and linear segments. In other examples, first pad hole opening 125 and/or second pad hole opening 127 defines a polygon.

Lining carrier 56 (e.g., lining carrier body 67) may define a hole 126 ("carrier hole 132") configured to receive fastener 124. In examples, fastener shank 128 is configured to insert into carrier hole 132 to, for example, secure friction pad 58 to lining carrier 56. In examples, lining carrier 56 defines carrier hole 132 such that carrier hole 132 extends (e.g., provides a passage from) carrier surface 60 to second carrier surface 64 on second carrier side 68 of lining carrier 56. In examples, carrier hole 132 opens to carrier surface 60 at a first opening 131 ("first carrier hole opening 131") and opens to second carrier surface 64 at a second opening 133 ("second carrier hole opening 133"). In examples, pad hole 126 and/or carrier hole 132 are configured such that fastener 124 is substantially stationary relative to friction pad 58 and/or lining carrier 56 when fastener 124 is inserted into pad hole 126 and carrier hole 132.

Friction pad 58 may define any number of pad holes configured similarly to pad hole 126. Lining carrier 56 may define any number of carrier holes configured similarly to carrier hole 132. Brake disc 50 may include any number of fasteners such as fastener 124 configured to extend through a pad hole and a carrier holes to secure friction pad 58 to lining carrier 56.

Friction pad 58 may be configured to transfer a torque around disc axis AD to lining carrier 56 in a manner substantially limiting shear forces on fastener 124 (e.g., on fastener shank 128 and/or fastener head 130). Friction pad 58 may be configured such that, when friction pad 58 receives a torque around disc axis AD, friction pad 58 transfers a majority and/or substantially all of the torque to lining carrier 56 by transferring torque from one or more recess boundaries (e.g., recess boundary 106) of recesses 114 to one or more protrusions (e.g., protrusion 92) of protrusions 108, such that transfer of the torque via fastener 124 is limiting and/or eliminated. For example, friction pad 58 may define pad hole 126 such that a cross-sectional dimension of pad hole 126 (e.g., a hole diameter) and/or a cross-sectional dimension of the fastener 124 (e.g., a fastener diameter) causes a gap G between fastener 124 and a boundary B of pad hole 126 (e.g., boundary B extending between first pad hole opening 125 and second pad hole opening 127). Friction pad 58 may be configured to define the Gap G or a similar gap between boundary B and fastener shank 128 and/or between boundary B and fastener head 130. Gap G may substantially limit and/or eliminates forces exchanged between boundary B and fastener shank 128 and/or fastener head 130. Friction pad 58 and/or fastener 124 may be configured to substantially maintain gap G or some portion thereof as recesses 114 transfer torque to protrusions 108, such that forces (e.g., shear forces) on fastener 124 are substantially limited and/or eliminated when friction pad 58 transfers torque around disc axis AD to lining carrier 56.

Friction pad 58 (e.g., friction pad body 90) may define a countersink 134 to, for example, reduce a length of fastener shank 128 and/or limit a protrusion of fastener head 130 beyond washer friction pad 58. For example, friction pad 58 may define countersink 134 to reduce and/or substantially eliminate a protrusion of fastener head 130 beyond friction surface 86 in the axial direction A. In examples, countersink 134 is a portion of pad hole 126. Countersink 134 may be present to reduce potential interference between brake disc 50 and other discs within a disc stack (e.g., one or more of rotor discs 18, 20, 22 and/or stator discs 24, 26 within disc stack 30 (FIG. 1)). In examples, countersink 134 is configured such fastener head 130 imparts a reaction force on friction pad 58 opposing a force on friction pad 58 acting in a direction from friction pad 58 toward fastener head 130, such that movement of friction pad 58 in a direction from friction pad 58 toward fastener head 130 is substantially limited and/or prevented.

In examples, first pad hole opening 127 is an opening to countersink 134. In some examples, countersink 134 is a tapered inset defining a countersink angle ("CS angle") which describes a taper as countersink 134 transitions from a major cross-sectional dimension (e.g., a major diameter) defined by first pad hole opening 127 to a minor cross-sectional dimension (e.g., a minor diameter) dimension less than the major dimension. In some examples, counter sink 192 is a counterbore defining an inset (e.g., a substantially cylindrical inset) extending from first pad hole opening 127 into friction pad body 90. Countersink 134 may extend into friction pad body 90 in a direction substantially parallel (e.g., parallel or nearly parallel to the extent permitted by manufacturing tolerances) to the axial direction A of brake disc.

In some examples, for example as depicted at FIG. 2, friction pad 58 may be a unitary pad such as an annular ring configured to surround disc aperture 52 of brake disc 50 when friction pad 58 covers carrier surface 60 (e.g., an annular ring bounded by pad outer perimeter 75 and pad inner perimeter 73). In some examples, friction pad 58 may comprise a plurality of pad sectors configured to surround disc aperture 52 of brake disc 50. In examples, a pad sector is configured to abut one or more other pad sectors in in the plurality of pad sectors, such that the pad sector may transfer a torque around disc axis AD to the one or more other pad sectors. In some examples, a pad sector is configured to substantially shield the abutting surface from an atmosphere surrounding brake disc 50 when the pad sector abuts the one or more other pad sectors to, for example, limit the exposure of friction pad body 90 to oxidation caused by the atmosphere surrounding brake disc 50.

Figure 8:
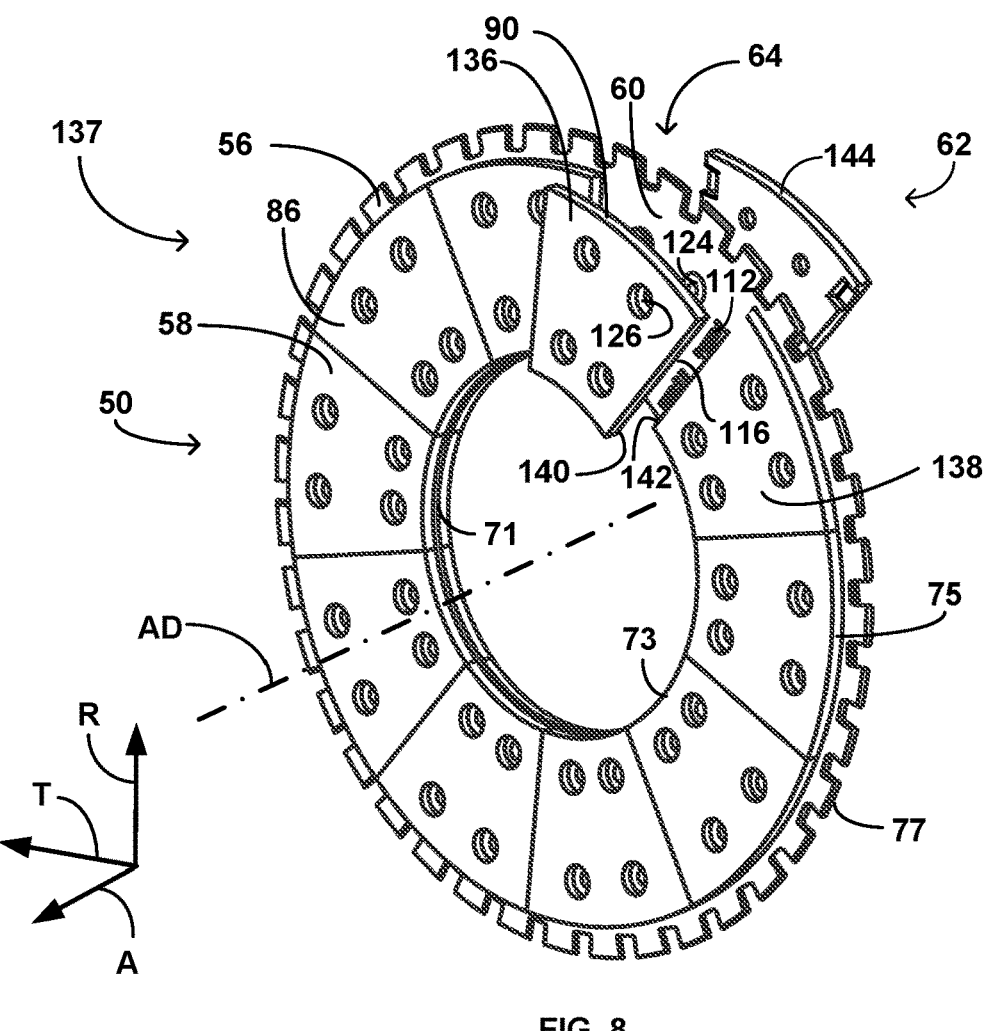
FIG. 8 is perspective view of brake disc including a plurality of pad sectors.
Figure 9:
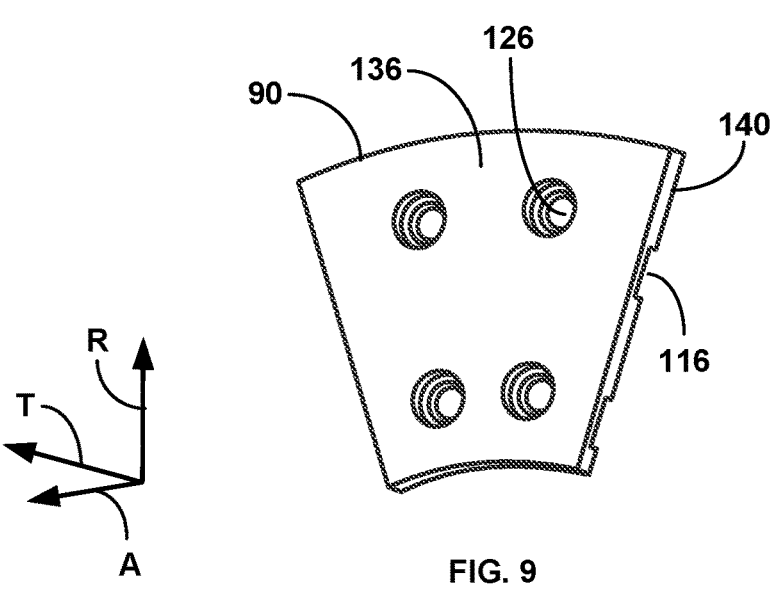
FIG. 9 is a perspective view of an example pad sector.

For example, FIG. 8 is a schematic illustration of brake disc 50 including a plurality of pad sectors 137, such as pad sector 136, pad sector 138, and others similarly depicted. The plurality of pad sectors 137 ("pad sectors 137") are configured to cover (e.g., contact) carrier surface 60. In FIG. 8, pad sector 136 is depicted as displaced from carrier surface 60 and the remainder of pad sectors 137 for clarity. FIG. 9 is a schematic illustration of pad sector 136. FIG. 8 and FIG. 9 include axes depicting the axial direction A, radial direction R, and tangential direction T of FIGS. 2-7 for reference.

Pad sectors 137 may comprise friction pad 58 such that pad sectors 137 cover carrier surface 60. Pad sectors 137 may be configured to define friction surface 86 and/or backing surface 88 of friction pad 58 when pad sectors 137 cover carrier surface 60. Pad sectors 137 may be configured to define friction pad body 90 of friction pad 58 when pad sectors 137 cover carrier surface 60. In examples, pad sectors 137 are configured to define pad outer perimeter 75 and/or pad inner perimeter 73 when pad sectors 137 cover carrier surface 60. In examples, one or more of pad sectors 137 define at least a portion of pad outer perimeter 75 and/or pad inner perimeter 73 when the one or more of pad sectors 137 cover (e.g., engage and/or contact) at least a portion of carrier surface 60.

In examples, a pad sector of pad sectors 137 (e.g., pad sector 136) may be configured to abut one or more other pad sectors in pad sectors 137 (e.g., pad sector 138) to, for example, limit the exposure of friction pad body 90 to oxidation caused by the atmosphere surrounding brake disc 50. Under certain conditions (e.g., during and/or following a braking operation of brake assembly 10), the environment surrounding brake disc 50 may be, for example, an oxidated, high temperature environment leading to relatively accelerated rates of oxidation of friction pad body 90. Pad sector 136 may be configured to abut pad sector 138 (and vice-versa) to reduce exposure of friction pad body 90 oxidated, high temperature environment, reducing and/or limiting oxidation of friction pad body 90.

For example, pad sector 136 may define a boundary surface 140 configured to abut (e.g., bear against) a boundary surface 142 of pad sector 138 when pad sectors 137 cover carrier surface 60. In examples, boundary surface 140 and/or boundary surface 142 extend over some distance between friction surface 86 and backing surface 88 when pad sectors 137 cover carrier surface 60. In examples, when pad sectors 137 cover carrier surface 60, boundary surface 140 is configured to substantially shield boundary surface 142 to limit and/or substantially eliminate exposure of boundary surface 142 to an atmosphere surrounding brake disc 50. In like manner, when pad sectors 137 cover carrier surface 60, boundary surface 142 may be configured to substantially shield boundary surface 140 to limit and/or substantially eliminate exposure of boundary surface 140 to an atmosphere surrounding brake disc 50. The shielding of boundary surface 140 and/or boundary surface 142 may limit the oxidation of a portion of friction pad body 190 comprising pad sector 136 and/or a portion of friction pad body 190 comprising pad sector 138. In examples, boundary surface 140 is configured to substantially conform to boundary surface 142 when pad sectors 137 cover carrier surface 60, define friction surface 86, and/or define backing surface 88.

Pad sectors 137 may be configured to define recesses 114 when pad sectors 137 cover carrier surface 60. In examples, one or more of the pad sectors 137 may define a recess such as recess 102. For example, as depicted at FIG. 7, pad sector 136 may define a first portion of recess 102 and pad sector 138 may define a second portion of recess 102 when boundary surface 140 abuts (e.g., contacts) boundary surface 142. For example, pad sector 136 may define first boundary portion 118 and/or pad sector 138 may define second boundary portion 120. In examples, each of pad sectors 137 defines at least a portion of at least one of recesses 114. In examples, each of pad sectors 137 defines at least one pad hole configured similarly to pad hole 126.

In examples, second friction pad 62 includes pad sector 144. Configurations of pad sector 144 individually and with reference to lining carrier 56, second friction pad 62, one or more protrusions, one or more fasteners, and/or other components and/or portions of brake disc 50 may be the same and/or similar to configurations described for pad sector 136, 138 individually and/or relative to lining carrier 56, friction pad 58, fastener 124, protrusion 92, and/or the other components and/or portions of brake disc 50.

Friction pads and/or friction pad bodies described herein, including friction pad 58, second friction pad 62, friction pad body 90, and pad sector 136, 138, 144 may be manufactured from any suitable material. In some examples, friction pads 58, 62, friction pad body 90, and/or pad sector 136, 138, 144 may be manufactured from a carbon-carbon composite material. In some examples, friction pads 58, 62, friction pad body 90, and/or pad sector 136, 138, 144 may be substantially recycled from a brake disc previously used in another brake assembly. For example, the previously used brake disc may be a brake disc which has reached an end-of-life criteria, such as a minimum thickness of the brake disc. friction pads 58, 62, friction pad body 90, and/or pad sector 136, 138, 144 may comprise portions of the previously used brake disc, such that brake disc 50 allows for further use of the brake disc material. For example, brake disc 50 may be configured such that the thickness TH (FIG. 3) is less than or equal to the minimum thickness at end-of-life of the previously used brake disc. Hence, brake disc 50 may allow for recycling of the brake disk material of the previously used brake disc, such that use of the brake disc material may be extended.

In some examples, friction pads 58, 62, friction pad body 90, and/or pad sector 136, 138, 144 may be manufactured using a carbon-carbon composite material having a high thermal stability, a high wear resistance, and/or stable friction properties. friction pads 58, 62, friction pad body 90, and/or pad sector 136, 138, 144 may include a carbon material with a plurality of carbon fibers and densifying material. The carbon fibers may be arranged in a woven or non-woven as either a single layer or multilayer structure. In some examples, friction pads 58, 62, friction pad body 90, and/or pad sector 136, 138, 144 described herein may be manufactured from a metal or a metal alloy, such as a steel alloy.

Rotational component 14, lining carrier 56, fastener 124, and/or other portions of brake disc 50 may be finish machined from a forging (e.g., an aluminum or steel forging). In other examples, rotational component 14, lining carrier 56, fastener 124, and/or other portions of brake disc 50 may be manufactured in a different manner. In yet other examples, rotational component 14, lining carrier 56, fastener 124, and/or other portions of brake disc 50 may be obtained rather than manufactured. Rotational component 14, lining carrier 56, fastener 124, and/or other portions of brake disc 50 may be made of any suitable material. In some examples, rotational component 14, lining carrier 56, fastener 124, and/or other portions of brake disc 50 includes a metal or a metal alloy. For example, rotational component 14, lining carrier 56, fastener 124, and/or other portions of brake disc 50 may include aluminum, a nickel alloy, a steel alloy (e.g., stainless steel), titanium, a carbon-composite material, or magnesium.

Figure 10:
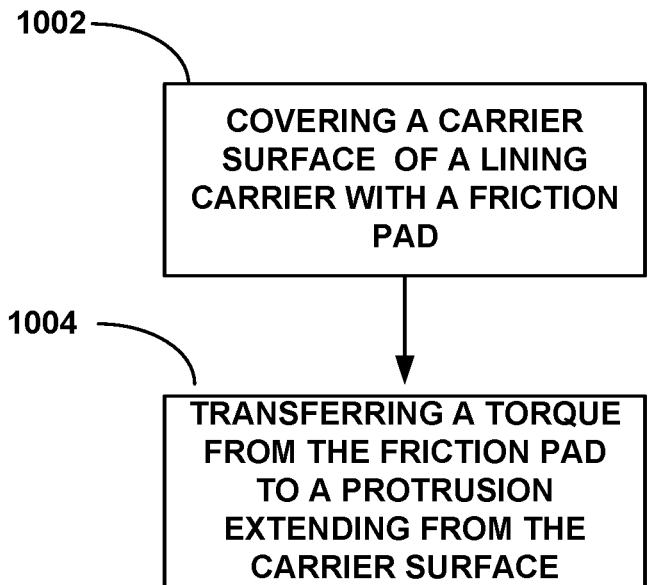
FIG. 10 is a flow diagram illustrating an example method of cooling a brake assembly.

FIG. 10 illustrates a flow diagram of an example technique for cooling a brake assembly. Although the technique is mainly described with reference to brake disc 50 and the components thereof (FIGS. 2-9), the technique may be used with other brake discs in other examples.

The technique includes covering a carrier surface 60, 64 of a lining carrier 56 with a friction pad 58, 62 to insert a protrusion 92, 110, 112 extending from carrier surface 60, 64 in a recess 102 of friction pad 58, 62 (1002). In examples, protrusion 92, 110, 112 extends through a recess opening 104 of recess 102 which opens into a backing surface 88 of friction pad 58, 62. In examples, recess 102 extends into friction pad body 90 of friction pad 58, 62 in a direction from backing surface 88 toward a friction surface 86 defined by friction pad body 90.

Protrusion 92, 110, 112 may contact a recess boundary 106 defining recess 102 when protrusion 92, 110, 112 inserts within recess 102. In examples, protrusion 92 contacts a first boundary portion 118 of recess boundary 106 and protrusion 110 contacts a second boundary portion 120 of recess boundary 106 when protrusion 92, 110, 112 inserts within recess 102. In examples, one or more of protrusions 108 insert into one of more recesses 114 when friction pad 58, 62 covers carrier surface 60, 64.

In examples, covering carrier surface 60, 64 with friction pad 58, 62 includes covering carrier surface 60, 64 with pad sectors 137 (e.g., pad sector 136, 138, 144). Pad sectors 137 may define backing surface 88 and/or friction surface 86 when pad sectors 137 cover carrier surface 60, 64. A pad sector of pad sectors 137 (e.g., pad sector 136) may abut one or more other pad sectors in pad sectors 137 (e.g., pad sector 138) when pad sectors 137 cover carrier surface 60, 64. In examples, a boundary surface 140 of pad sector 136 abuts (e.g., bears against) a boundary surface 142 of pad sector 138 when pad sectors 137 cover carrier surface 60, 64. In examples, when pad sectors 137 cover carrier surface 60, boundary surface 140 substantially shields boundary surface 142 to limit and/or substantially eliminate exposure of boundary surface 142 to an atmosphere surrounding brake disc 50. In examples, boundary surface 140 substantially conforms to boundary surface 142 when pad sectors 137 cover carrier surface 60.

The technique includes transferring a torque from friction pad 58, 62 to protrusion 92, 110, 112 (1004). In examples, recess boundary 106 transfers the torque from friction pad 58, 62 to protrusion 92, 110, 112. In examples, first boundary portion 118 transfers a torque T1 to protrusion 92 and/or second boundary portion 120 transfers a torque T2 to protrusion 110 when friction pad 58, 62 transfers the torque. Protrusion 92, 110, 112 may transfer the torque to a lining carrier body 67 of lining carrier 56, such that friction pad 58, 62 transfer the torque to lining carrier 56 via protrusion 92, 110, 112, In examples, one or more recess boundaries of recesses 114 transfer the torque to protrusions 108.

In examples, the technique includes coupling friction pad 58, 62 to lining carrier 56 to limit and/or substantially eliminate movement of friction pad 58, 62 relative to lining carrier 56 (e.g., carrier surface 60) in an axial direction A of brake disc 50. Carrier surface 60 may contact backing surface 88 when friction pad 58, 62 is coupled to lining carrier 56. In examples, a fastener 124 (e.g., a rivet) couples friction pad 58, 62 and lining carrier 56. Fastener 124 (e.g., a fastener shank 128) may extend through a pad hole 126 defined by friction pad body 90 and/or carrier hole 132 defined by lining carrier body 67 to couple friction pad 58, 62 and lining carrier 56. In examples, a fastener head 130 traps (e.g., positions) a portion of friction pad body 90 between fastener head 130 and lining carrier 56 when fastener 124 extends through pad hole 126 and/or carrier hole 132. In examples, fastener head 130 positions within a countersink defined by friction pad body 90 when fastener 124 coupled friction pad 58, 62 and lining carrier 56.

The present disclosure includes the following examples.

Example 1: A brake disc comprising: a lining carrier configured to rotate around a disc axis, wherein the lining carrier defines a carrier surface and a protrusion extending from the carrier surface, and wherein the carrier surface and the protrusion are configured to rotate around the disc axis when the lining carrier rotates about the disc axis; a friction pad configured to cover the carrier surface, wherein the friction pad defines a recess boundary defining a recess, wherein the friction pad is configured to rotate around the disc axis when the lining carrier rotates about the disc axis and the friction pad covers the carrier surface, wherein the protrusion is configured to insert within the recess when the friction pad covers the carrier surface, and wherein the recess boundary is configured to transfer a torque around the disc axis from the friction pad to the protrusion when the protrusion is inserted in the recess and the torque is imparted to the friction pad.

Example 2: The brake disc of claim 1, wherein the lining carrier defines an inner perimeter defining a disc aperture and an outer perimeter surrounding the inner perimeter, wherein the disc axis extends through the disc aperture, and wherein the carrier surface is between the inner perimeter and the outer perimeter.

Example 3: The brake disc of claim 1 or claim 2, wherein the lining carrier defines a disc slot on one of an inner perimeter of the lining carrier or an outer perimeter of the lining carrier surrounding the inner perimeter, wherein the disc slot is configured to receive the torque from a rotor drive key or a spline extending through the disc slot.

Example 4: The brake disc of any of examples 1-3, wherein: the friction pad defines a friction surface configured to face away from the lining carrier when the friction pad covers the carrier surface, the friction pad defines a backing surface opposite the friction surface, the backing surface configured to engage the carrier surface when the friction pad covers the carrier surface, and the recess extends from the backing surface in a direction toward the friction surface.

Example 5: The brake disc of any of examples 1-4, wherein: the friction pad defines a pad thickness in an axial direction of the brake disc from a backing surface of the friction pad to a friction surface of the friction pad, the recess defines a recess depth in the axial direction of the brake disc, the recess depth configured to allow the protrusion to insert within the recess when the friction pad covers the carrier surface, and the recess depth is less than the pad thickness.

Example 6: The brake disc of any of examples 1-5, wherein the lining carrier defines a plurality of protrusions and the friction pad defines a plurality of recess boundaries, and wherein friction pad is configured to transfer the torque from the plurality of recess boundaries to the plurality of protrusions.

Example 7: The brake disc of any of examples 1-6, further comprising a fastener configured to extend through at least a portion of the friction pad to couple the friction pad to the lining carrier, wherein the fastener is configured to limit movement of the friction pad relative to the lining carrier in at least an axial direction of the brake disc when the friction pad and the lining carrier are coupled by the fastener.

Example 8: The brake disc of example 7, wherein: the friction pad defines a hole extending through the friction pad, the fastener is configured to extend through the hole and into the lining carrier to couple the friction pad to the lining carrier, and the friction pad is configured to define a gap between a boundary of the hole and the fastener when the fastener extends through the hole, the fastener extends into the brake disc, and the recess boundary transfers the torque to the protrusion.

Example 9: The brake disc of example 7 or example 8, wherein: the fastener defines a fastener shank and a fastener head at an end portion of the fastener shank, the friction pad defines a countersink recessed within a friction surface of the friction pad, the countersink defining a head bearing surface, and the fastener head is configured to engage the head bearing surface when the fastener shank couples the friction pad to the lining carrier.

Example 10: The brake disc of any of examples 1-9, wherein the protrusion is configured to limit movement of the friction pad relative to the lining carrier in at least a tangential direction of the brake disc when the recess boundary transfers the torque to the protrusion.

Example 11: The brake disc of any of examples 1-10, wherein the lining carrier defines a second carrier surface on a side of the brake disc opposite the carrier surface and a second protrusion extending from the second carrier surface, wherein the second carrier surface and the second protrusion are configured to rotate around the disc axis when the lining carrier rotates about the disc axis, and further comprising: a second friction pad configured to cover at least a portion of the second carrier surface, wherein the second friction pad defines a second recess boundary defining a second recess, wherein the protrusion is configured to insert within the recess when the second friction covers the portion of the second carrier surface, and wherein the second recess boundary is configured to transfer a second torque around the disc axis to the second protrusion when the second protrusion is inserted in the second recess and the second torque is imparted to the second friction pad.

Example 12: The brake disc of example 11, further comprising a fastener configured to extend through at least a portion of the second friction pad to couple the second friction pad to the lining carrier, wherein the fastener is configured to limit movement of the second friction pad relative to the lining carrier in at least an axial direction of the brake disc when the second friction pad and the lining carrier are coupled by the fastener.

Example 13: The brake disc of any of examples 1-12, wherein the friction pad comprises a plurality of pad sectors configured to couple to the lining carrier, wherein each pad sector is configured to abut at least one other pad sector when the plurality of pad sectors are coupled to the lining carrier.

Example 14: The brake disc of any of examples 1-13, wherein the lining carrier defines an inner perimeter defining a disc aperture and an outer perimeter surrounding the inner perimeter, wherein the disc axis extends through the disc aperture, and wherein the friction pad surrounds the aperture.

Example 15: The brake disc of any of examples 1-14, wherein the friction pad comprises at least one of a carbon or carbon composite material, and wherein the lining carrier comprises a steel.

Example 16: A brake disc, comprising: a lining carrier defining an inner perimeter defining a disc aperture and an outer perimeter surrounding the inner perimeter, wherein the lining carrier is configured to rotate around a disc axis extending through the aperture, wherein the lining carrier defines a carrier surface between the inner perimeter and the outer perimeter and a protrusion extending from the carrier surface, wherein the carrier surface and the protrusion are configured to rotate around the disc axis when the lining carrier rotates about the disc axis, and wherein the lining carrier defines a disc slot on one of the inner perimeter or the outer perimeter, the disc slot configured to receive a torque around the disc axis from a rotor drive key or a spline extending through the disc slot; a friction pad configured to cover at least a carrier surface, wherein the friction pad defines a recess boundary defining a recess; and a fastener configured to extend through at least a portion of the friction pad to couple the friction pad to the lining carrier, wherein the friction pad is configured to rotate around the disc axis when the lining carrier rotates about the disc axis and the friction pad is coupled to the lining carrier, wherein the protrusion is configured to insert within the recess when the friction pad is coupled to the lining carrier, and wherein the recess boundary is configured to transfer a torque around the disc axis from the friction pad to the protrusion when the protrusion is inserted in the recess and the and the torque is imparted to the friction pad.

Example 17: The brake disc of example 16, wherein: the friction pad defines a friction surface configured to face away from the lining carrier when the friction pad covers the carrier surface, the friction pad defines a backing surface opposite the friction surface and configured to engage the carrier surface when the friction pad covers the carrier surface, and the recess extends from the backing surface in a direction toward the friction surface.

Example 18: The brake disc of example 16 or example 17, wherein: the friction pad defines an access boundary defining a fastener access extending through the friction pad, the fastener is configured to extend through the fastener access and into the lining carrier to couple the friction pad to the lining carrier, and the friction pad is configured to define a gap between the access boundary and the fastener when the fastener extends through the fastener access, the fastener extends into the lining carrier, and the recess boundary transfers the torque to the protrusion.

Example 19: A method, comprising: covering, using a friction pad defining a recess boundary defining a recess, at least a portion of a carrier surface of a lining carrier of a brake disc, wherein a protrusion extends from the carrier surface, wherein the friction pad is configured to rotate around a disc axis when the friction pad covers the carrier surface and the lining carrier rotates about the disc axis, and wherein the protrusion inserts within the recess when the friction pad cover the carrier surface; transferring a torque on the friction pad, using the recess boundary, to the protrusion; and transferring the torque, using the protrusion, to a body of the lining carrier.

Example 20: The method of example 19, further comprising: limiting movement, using a fastener, of the friction pad relative to the lining carrier in at least an axial direction of the brake disc, wherein the friction pad defines an access boundary defining a fastener access extending through the friction pad, and wherein the fastener extends through the fastener access and into the lining carrier; and establishing a gap, using the friction pad, between the access boundary and the fastener when the fastener extends through the fastener access, the fastener extends into the lining carrier, and the recess boundary transfers the torque to the protrusion.

Various examples have been described. These and other examples are within the scope of the following claims.

What is claimed is:

1. A brake disc, comprising:
a lining carrier defining an inner perimeter defining a disc aperture and an outer perimeter surrounding the inner perimeter,
wherein the lining carrier is configured to rotate around a disc axis extending through the aperture,
wherein the lining carrier defines a carrier surface between the inner perimeter and the outer perimeter and a protrusion extending from the carrier surface,
wherein the carrier surface and the protrusion are configured to rotate around the disc axis when the lining carrier rotates about the disc axis, and
wherein the lining carrier defines a disc slot on one of the inner perimeter or the outer perimeter, the disc slot configured to receive a torque around the disc axis from a rotor drive key or a spline extending through the disc slot;
a friction pad configured to cover at least a carrier surface, wherein the friction pad defines a recess boundary defining a recess; and
a fastener configured to extend through at least a portion of the friction pad to couple the friction pad to the lining carrier, wherein:
the friction pad is configured to rotate around the disc axis when the lining carrier rotates about the disc axis and the friction pad is coupled to the lining carrier,
the protrusion is configured to insert within the recess when the friction pad is coupled to the lining carrier,
the recess boundary is configured to transfer a torque around the disc axis from the friction pad to the protrusion when the protrusion is inserted in the recess and the and the torque is imparted to the friction pad,
the friction pad defines an access boundary defining a fastener access extending through the friction pad,
the fastener is configured to extend through the fastener access and into the lining carrier to couple the friction pad to the lining carrier, and
the friction pad is configured to define a gap between the access boundary and the fastener when the fastener extends through the fastener access, the fastener extends into the lining carrier, and the recess boundary transfers the torque to the protrusion.

2. The brake disc of claim 1, wherein:
the friction pad defines a friction surface configured to face away from the lining carrier when the friction pad covers the carrier surface,
the friction pad defines a backing surface opposite the friction surface and configured to engage the carrier surface when the friction pad covers the carrier surface, and
the recess extends from the backing surface in a direction toward the friction surface.

3. The brake disc of claim 1, wherein the inner perimeter of the lining carrier defines a disc aperture, wherein the disc axis extends through a disc aperture, and wherein the carrier surface is between the inner perimeter and the outer perimeter.

4. The brake disc of claim 1, wherein:
the friction pad defines a pad thickness in an axial direction of the brake disc from a backing surface of the friction pad to a friction surface of the friction pad, the recess defines a recess depth in the axial direction of the brake disc, the recess depth configured to allow the protrusion to insert within the recess when the friction pad covers the carrier surface, and
the recess depth is less than the pad thickness.

5. The brake disc of claim 1, wherein the lining carrier defines a plurality of protrusions and the friction pad defines a plurality of recess boundaries, and wherein friction pad is configured to transfer the torque from the plurality of recess boundaries to the plurality of protrusions.

6. The brake disc of claim 1, wherein:
the fastener defines a fastener shank and a fastener head at an end portion of the fastener shank,
the friction pad defines a countersink recessed within a friction surface of the friction pad, the countersink defining a head bearing surface, and
the fastener head is configured to engage the head bearing surface when the fastener shank couples the friction pad to the lining carrier.

7. The brake disc of claim 1, wherein the protrusion is configured to limit movement of the friction pad relative to the lining carrier in at least a tangential direction of the brake disc when the recess boundary transfers the torque to the protrusion.

8. The brake disc of claim 1, wherein the lining carrier defines a second carrier surface on a side of the brake disc opposite the carrier surface and a second protrusion extending from the second carrier surface, wherein the second carrier surface and the second protrusion are configured to rotate around the disc axis when the lining carrier rotates about the disc axis, and further comprising:
a second friction pad configured to cover at least a portion of the second carrier surface,
wherein the second friction pad defines a second recess boundary defining a second recess,
wherein the protrusion is configured to insert within the recess when the second friction covers the portion of the second carrier surface, and
wherein the second recess boundary is configured to transfer a second torque around the disc axis to the second protrusion when the second protrusion is inserted in the second recess and the second torque is imparted to the second friction pad.

9. The brake disc of claim 8, further comprising a fastener configured to extend through at least a portion of the second friction pad to couple the second friction pad to the lining carrier, wherein the fastener is configured to limit movement of the second friction pad relative to the lining carrier in at least an axial direction of the brake disc when the second friction pad and the lining carrier are coupled by the fastener.

10. The brake disc of claim 1, wherein the friction pad comprises a plurality of pad sectors configured to couple to the lining carrier, wherein each pad sector is configured to abut at least one other pad sector when the plurality of pad sectors are coupled to the lining carrier.

11. The brake disc of claim 1, wherein the lining carrier defines an inner perimeter defining a disc aperture and an outer perimeter surrounding the inner perimeter, wherein the disc axis extends through the disc aperture, and wherein the friction pad surrounds the aperture.

12. The brake disc of claim 1, wherein the friction pad comprises at least one of a carbon or carbon composite material, and wherein the lining carrier comprises a steel.

13. A method, comprising:
covering, using a friction pad defining a recess boundary defining a recess, at least a portion of a carrier surface of a lining carrier of a brake disc, wherein a protrusion extends from the carrier surface, wherein the friction pad is configured to rotate around a disc axis when the friction pad covers the carrier surface and the lining carrier rotates about the disc axis, and wherein the protrusion inserts within the recess when the friction pad cover the carrier surface;

transferring a torque on the friction pad, using the recess boundary, to the protrusion;

transferring the torque, using the protrusion, to a body of the lining carrier, limiting movement, using a fastener, of the friction pad relative to the lining carrier in at least an axial direction of the brake disc, wherein the friction pad defines an access boundary defining a fastener access extending through the friction pad, and wherein the fastener extends through the fastener access and into the lining carrier; and establishing a gap, using the friction pad, between the access boundary and the fastener when the fastener extends through the fastener access, the fastener extends into the lining carrier, and the recess boundary transfers the torque to the protrusion.

14. The method of claim 13, wherein the friction pad defines a plurality of pad sectors, and wherein the method further includes bearing a first boundary surface of a first pad sector of the plurality of pad sectors against a second boundary surface of a second pad sector of the plurality of pad sectors.

15. The method of claim 14, wherein the first boundary surface shields the second boundary surface to limit exposure of the second boundary surface to an atmosphere.

16. The method of claim 14, wherein the first boundary surface conforms to the second boundary surface.

17. The method of claim 13, wherein transferring a torque to the protrusion comprises transferring a first torque with a first boundary portion and transferring a second torque with a second boundary portion.

18. The method of claim 13, further comprising positioning a fastener head within a countersink defined by the friction pad.

* * * * *